US012720093B2

(12) United States Patent
Chen et al.

(10) Patent No.: US 12,720,093 B2
(45) Date of Patent: Aug. 25, 2026

(54) DEVICE AND METHOD FOR DECODING VIDEO DATA

(71) Applicant: SHARP KABUSHIKI KAISHA, Sakai City (JP)

(72) Inventors: Chih-Yuan Chen, Taipei (TW); Yu-Chiao Yang, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/763,360

(22) Filed: Jul. 3, 2024

(65) Prior Publication Data

US 2025/0016343 A1 Jan. 9, 2025

Related U.S. Application Data

(60) Provisional application No. 63/524,727, filed on Jul. 3, 2023.

(51) Int. Cl.
*H04N 19/44* (2014.01)
*H04N 19/105* (2014.01)
*H04N 19/176* (2014.01)
*H04N 19/82* (2014.01)

(52) U.S. Cl.
CPC ........... *H04N 19/44* (2014.11); *H04N 19/105* (2014.11); *H04N 19/176* (2014.11)

(58) Field of Classification Search
CPC ..... H04N 19/82; H04N 19/105; H04N 19/117
See application file for complete search history.

(56) References Cited

U.S. PATENT DOCUMENTS 10,200,700 B2 * 2/2019 Zhang .................... H04N 19/14
11,463,713 B2 * 10/2022 Deng .................. H04N 19/157
11,647,198 B2 * 5/2023 Deng .................. H04N 19/132 375/240.02
11,968,368 B2 * 4/2024 Liu ...................... H04N 19/105
12,477,126 B2 * 11/2025 Li ........................ H04N 19/105
12,483,700 B2 * 11/2025 Chen .................... H04N 19/105

OTHER PUBLICATIONS

Non-local CCP and cross-component merge mode; Zhang—2023. (Year: 2023).*
Enhanced CCP linear model for chroma intra prediction; Zhang—2018. (Year: 2018).*

* cited by examiner

*Primary Examiner* — Luis Perez-Fuentes
(74) *Attorney, Agent, or Firm* — ScienBiziP, P.C.

(57) ABSTRACT

A method of decoding video data performed by an electronic device is provided. The method receives the video data and determines a block unit from a current frame included in the video data. The method further determines a cross-component prediction (CCP) merge list of the block unit, including several CCP merge candidates of the block unit, and selects one of the CCP merge candidates to determine a prediction model and a filtering flag of the selected CCP merge candidate. The method then predicts the block unit using the prediction model to generate a prediction block of the block unit, determines, based on the filtering flag, whether the prediction block of the block unit is further filtered to generate a predicted block of the block unit, and reconstructs the block unit based on the predicted block of the block unit.

20 Claims, 7 Drawing Sheets

DEVICE AND METHOD FOR DECODING VIDEO DATA

CROSS-REFERENCE TO RELATED APPLICATION(S)

The present disclosure claims the benefit of and priority to U.S. Provisional Patent Application Ser. No. 63/524,727, filed on Jul. 3, 2023, entitled "On Cross-Component Prediction Improvements," the content of which is hereby incorporated herein fully by reference in its entirety for all purposes.

FIELD

The present disclosure generally relates to video coding, and more specifically, to techniques for predicting a block unit based on a cross-component prediction (CCP) prediction model and a filtering flag of a CCP merge candidate.

BACKGROUND

Cross-component prediction (CCP) mode is a chroma coding tool for video coding, in which, an encoder and/or a decoder may predict a chroma block of a current block based on a luma block of the current block by using a prediction model.

In addition, the encoder and/or the decoder may derive the prediction model of the chroma block based on other prediction models of other blocks reconstructed prior to the reconstruction of the current block. The prediction models of other blocks, however, are not derived based on multiple neighboring samples neighboring the current block. Thus, the prediction model of the chroma block derived based on the prediction models of other blocks may be inadequate to predict all of several chroma samples in the chroma block.

Thus, different types of model refinement modes may be required for the encoder and/or the decoder to be able to precisely and efficiently predict and/or reconstruct the chroma block of the block unit.

SUMMARY

The present disclosure is directed to a device and method for predicting a block unit based on a prediction model and a filtering flag of a CCP merge candidate.

In a first aspect of the present disclosure, a method of decoding video data and an electronic device for performing the method are provided. The method includes receiving the video data; determining a block unit from a current frame included in the video data; determining a cross-component prediction (CCP) merge list of the block unit including a plurality of CCP merge candidates of the block unit; selecting one of the plurality of CCP merge candidates for the block unit to determine a prediction model and a filtering flag of the selected one of the plurality of CCP merge candidates, wherein the filtering flag of the selected one of the plurality of CCP merge candidates being equal to one specifies that a CCP reference prediction is further filtered after a CCP reference block corresponding to the selected one of the plurality of CCP merge candidates is predicted using the prediction model to generate the CCP reference prediction; predicting the block unit using the prediction model to generate a prediction block of the block unit; determining, based on the filtering flag of the selected one of the plurality of CCP merge candidates, whether the prediction block of the block unit is further filtered to generate a predicted block of the block unit; and reconstructing the block unit based on the predicted block of the block unit.

In another implementation of the first aspect of the present disclosure, the filtering flag of the selected one of the plurality of CCP merge candidates is determined from the video data for determining whether the prediction block of the block unit is further filtered when a cross-component model mode of the prediction model of the selected one of the plurality of CCP merge candidates is one of a plurality of multiple-model cross-component prediction modes, and the filtering flag of the selected one of the plurality of CCP merge candidates is determined to be equal to zero without parsing the video data for determining that the prediction block of the block unit is not filtered when the cross-component model mode of the prediction model of the selected one of the plurality of CCP merge candidates is different from each of the plurality of multiple-model cross-component prediction modes.

In another implementation of the first aspect of the present disclosure, the plurality of multiple-model cross-component prediction modes includes a multiple-model linear model (MMLM) prediction mode, a multiple-model gradient linear mode (MM-GLM) prediction mode, a multiple-model convolutional cross-component model (MM-CCCM) prediction mode, a multiple-model gradient-and-location-based convolutional cross-component model (MM-GL-CCCM) prediction mode, a multiple-model no-subsampling convolutional cross-component model (MM-NS-CCCM) prediction mode, and a multiple-model convolutional cross-component model using multiple down-sampling filters (MM-MDF-CCCM) prediction mode.

In another implementation of the first aspect of the present disclosure, each of the plurality of CCP merge candidates of the block unit has a CCP candidate model, the prediction model comprises the CCP candidate model of the selected one of the plurality of CCP merge candidates having a plurality of model coefficients, and predicting the block unit using the prediction model to generate the prediction block of the block unit is further based on the plurality of model coefficients of the CCP candidate model of the selected one of the plurality of CCP merge candidates.

In another implementation of the first aspect of the present disclosure, the plurality of CCP merge candidates of the block unit is selected from a plurality of CCP predefined candidates, and the plurality of CCP predefined candidates includes at least one of a plurality of spatial adjacent CCP merge candidates, a plurality of spatial non-adjacent CCP merge candidates, a plurality of history-based CCP merge candidates, a plurality of temporal CCP merge candidates, a plurality of block-vector-based CCP merge candidates, or a plurality of default CCP merge candidates.

In another implementation of the first aspect of the present disclosure, the filtering flag of the selected one of the plurality of CCP merge candidates is a ccFilter flag indicating whether the CCP reference prediction is further filtered by a local-boosting filter, and the filtering flag of the selected one of the plurality of CCP merge candidates being equal to zero specifies that the CCP reference prediction is not filtered by the local-boosting filter.

In another implementation of the first aspect of the present disclosure, the prediction block of the block unit is further filtered by the local-boosting filter to generate the predicted block of the block unit when a filtering flag of the block unit inherited from the filtering flag of the selected one of the plurality of CCP merge candidates is equal to one, and the prediction block of the block unit is determined, without being filtered by the local-boosting filter, as the predicted block of the block unit when the filtering flag of the block unit inherited from the filtering flag of the selected one of the plurality of CCP merge candidates is equal to zero.

An implementation of the first aspect of the present disclosure further includes determining a CCP derived model for the block unit, wherein the CCP derived model is derived by an MM-CCCM prediction mode; and predicting the block unit using the CCP derived model to generate a CCP derived block of the block unit.

An implementation of the first aspect of the present disclosure further includes weightedly combining the predicted block and the CCP derived block of the block unit to generate a weighted block, wherein reconstructing the block unit based on the predicted block of the block unit is further based on the weighted block.

An implementation of the first aspect of the present disclosure further includes determining a CCP merge fusion flag from the video data, wherein the CCP merge fusion flag being equal to one specifies that reconstructing the block unit based on the predicted block of the block unit is further based on the CCP derived block of the block unit.

An implementation of the first aspect of the present disclosure further includes determining a CCP merge block of the block unit based on the plurality of CCP merge candidates to determine the CCP merge model of the CCP merge block, wherein: the CCP merge model of the CCP merge block is used to predict the CCP merge block, and the CCP derived model of the block unit is inherited from the CCP merge model of the CCP merge block for predicting the block unit.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DETAILED DESCRIPTION

Figure 1:
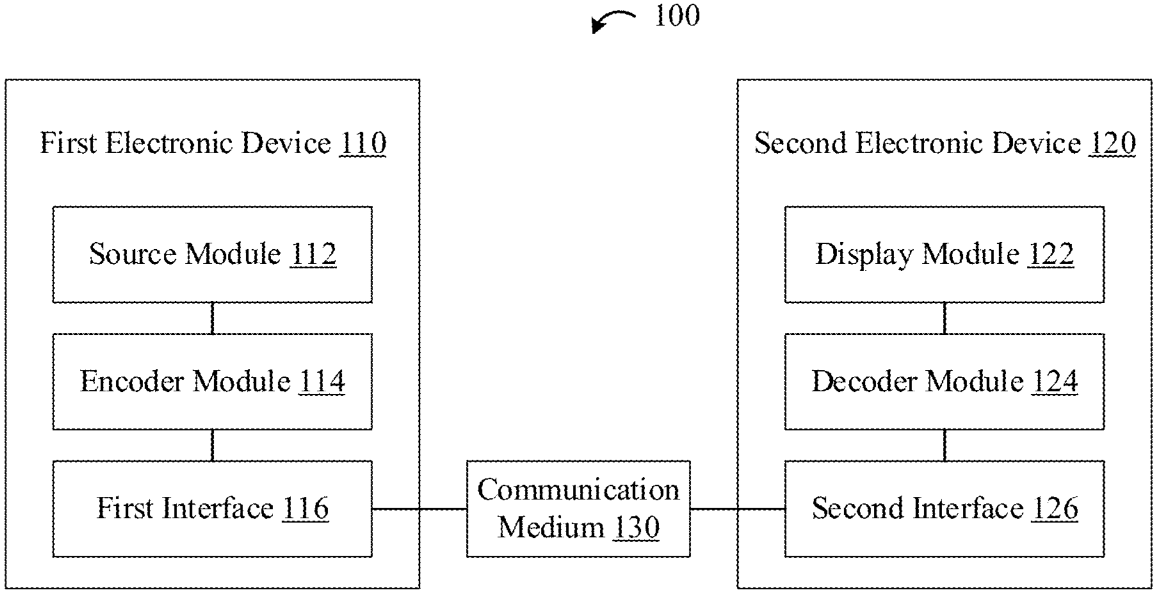
FIG. 1 is a block diagram illustrating a system having a first electronic device and a second electronic device for encoding and decoding video data, in accordance with one or more example implementations of this disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and ease of understanding, features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly through intervening components, and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details, such as functional entities, techniques, protocols, and standards, are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having one or more computer-executable instructions stored on a computer-readable medium, such as memory or other types of storage devices. For example, one or more microprocessors or general-purpose computers with communication processing capability may be programmed with computer-executable instructions and perform the disclosed function(s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes, but is not limited to, random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-executable instructions. The computer-readable medium may be a non-transitory computer-readable medium.

FIG. 1 is a block diagram illustrating a system 100 having a first electronic device and a second electronic device for encoding and decoding video data, in accordance with one or more example implementations of this disclosure.

The system 100 includes a first electronic device 110, a second electronic device 120, and a communication medium 130.

The first electronic device 110 may be a source device including any device configured to encode video data and transmit the encoded video data to the communication medium 130. The second electronic device 120 may be a destination device including any device configured to receive encoded video data via the communication medium 130 and decode the encoded video data.

The first electronic device 110 may communicate via wire, or wirelessly, with the second electronic device 120 via the communication medium 130. The first electronic device 110 may include a source module 112, an encoder module 114, and a first interface 116, among other components. The second electronic device 120 may include a display module 122, a decoder module 124, and a second interface 126, among other components. The first electronic device 110 may be a video encoder and the second electronic device 120 may be a video decoder.

The first electronic device 110 and/or the second electronic device 120 may be a mobile phone, a tablet, a desktop, a notebook, or other electronic devices. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive the video from a video content provider. The source module 112 may generate computer graphics-based data, as the source video, or may generate a combination of live video, archived video, and computer-generated video, as the source video. The video capture device may include a charge-coupled device (CCD) image sensor, a complementary metal-oxide-semiconductor (CMOS) image sensor, or a camera.

The encoder module 114 and the decoder module 124 may each be implemented as any one of a variety of suitable encoder/decoder circuitry, such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having computer-executable instructions for the software in a suitable, non-transitory computer-readable medium and execute the stored computer-executable instructions using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB, or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE), or Time-Division LTE (TD-LTE). The first interface 116 and the second interface 126 may each include any device configured to transmit a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure(s) that may be used to interconnect peer devices.

The display module 122 may include a display using liquid crystal display (LCD) technology, plasma display technology, organic light-emitting diode (OLED) display technology, or light-emitting polymer display (LPD) technology, with other display technologies used in some other implementations. The display module 122 may include a High-Definition display or an Ultra-High-Definition display.

Figure 2:
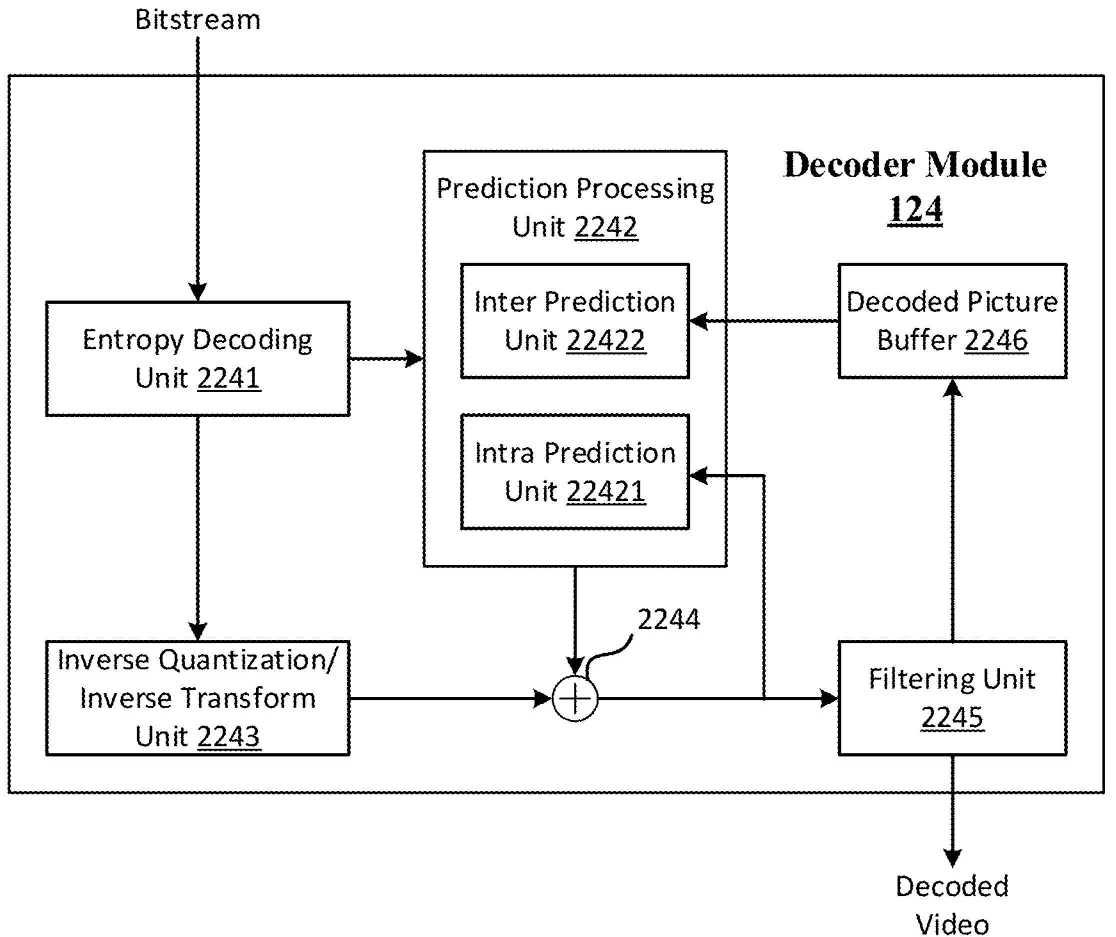
FIG. 2 is a block diagram illustrating a decoder module of the second electronic device illustrated in FIG. 1, in accordance with one or more example implementations of this disclosure.

FIG. 2 is a block diagram illustrating a decoder module 124 of the second electronic device 120 illustrated in FIG. 1, in accordance with one or more example implementations of this disclosure. The decoder module 124 may include an entropy decoder (e.g., an entropy decoding unit 2241), a prediction processor (e.g., a prediction processing unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction processing unit 2242 further may include an intra prediction processor (e.g., an intra prediction unit 22421) and an inter prediction processor (e.g., an inter prediction unit 22422). The decoder module 124 receives a bitstream, decodes the bitstream, and outputs a decoded video.

The entropy decoding unit 2241 may receive the bitstream including multiple syntax elements from the second interface 126, as shown in FIG. 1, and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and/or other syntax information.

The entropy decoding unit 2241 may perform context-adaptive variable length coding (CAVLC), context-adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction processing unit 2242.

The prediction processing unit 2242 may receive syntax elements, such as motion vectors, intra modes, partition information, and other syntax information, from the entropy decoding unit 2241. The prediction processing unit 2242 may receive the syntax elements including the partition information and divide image frames according to the partition information.

Each of the image frames may be divided into at least one image block according to the partition information. The at least one image block may include a luminance block for reconstructing multiple luminance samples and at least one chrominance block for reconstructing multiple chrominance samples. The luminance block and the at least one chrominance block may be further divided to generate macroblocks, coding tree units (CTUs), coding blocks (CBs), subdivisions thereof, and/or other equivalent coding units.

During the decoding process, the prediction processing unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. The intra prediction unit 22421 may reconstruct multiple chroma components of the current block unit based on multiple luma components of the current block unit when the multiple chroma components is reconstructed by the prediction processing unit 2242.

The intra prediction unit 22421 may reconstruct multiple chroma components of the current block unit based on the multiple luma components of the current block unit when the multiple luma components of the current block unit is reconstructed by the prediction processing unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit may be a block determined to closely match the current block unit. The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process, such as a discrete cosine transform (DCT), a discrete sine transform (DST), an adaptive multiple transform (AMT), a mode-dependent non-separable secondary transform (MDNSST), a Hypercube-Givens transform (HyGT), a signal-dependent transform, a Karhunen-Loéve transform (KLT), a wavelet transform, an integer transform, a sub-band transform, or a conceptually similar transform. The inverse transformation may convert the residual information from a transform domain, such as a frequency domain, back to the pixel domain, etc. The degree of inverse quantization may be modified by adjusting a quantization parameter.

The summer 2244 may add the reconstructed residual block to the predicted block provided by the prediction processing unit 2242 to produce a reconstructed block.

The filtering unit 2245 may include a deblocking filter, a sample adaptive offset (SAO) filter, a bilateral filter, and/or an adaptive loop filter (ALF) to remove the blocking artifacts from the reconstructed block. Additional filters (in loop or post loop) may also be used in addition to the deblocking filter, the SAO filter, the bilateral filter, and the ALF. Such filters (are not explicitly illustrated for brevity of the description) may filter the output of the summer 2244. The filtering unit 2245 may output the decoded video to the display module 122 or other video receiving units after the filtering unit 2245 performs the filtering process for the reconstructed blocks of the specific image frame.

The decoded picture buffer 2246 may be a reference picture memory that stores the reference block to be used by the prediction processing unit 2242 in decoding the bitstream (e.g., in inter-coding modes). The decoded picture buffer 2246 may be formed by any one of a variety of memory devices, such as a dynamic random-access memory (DRAM), including synchronous DRAM (SDRAM), magneto-resistive RAM (MRAM), resistive RAM (RRAM), or other types of memory devices. The decoded picture buffer 2246 may be on-chip along with other components of the decoder module 124 or may be off-chip relative to those components.

Figure 3:
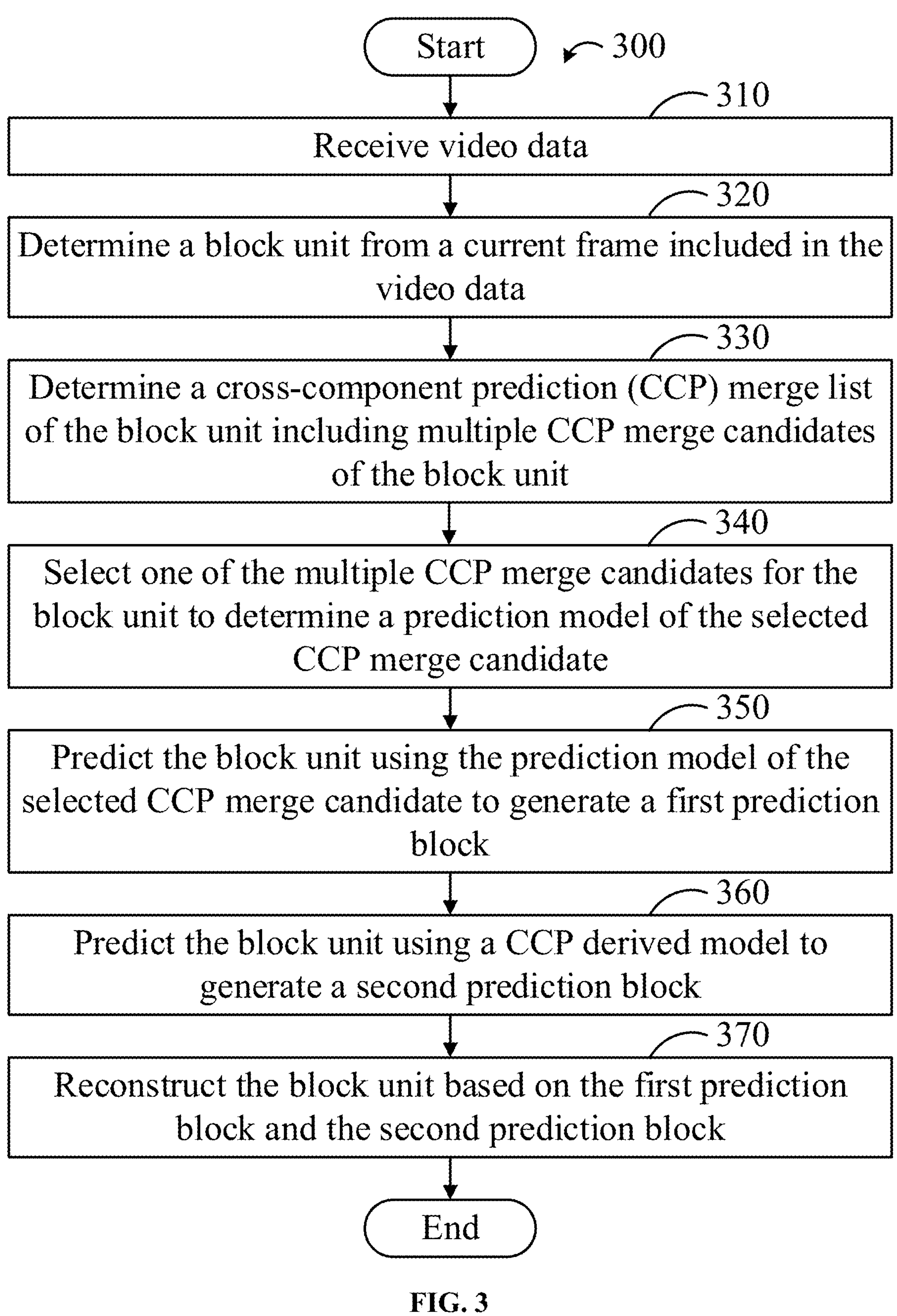
FIG. 3 is a flowchart illustrating a method/process for decoding and/or encoding video data by an electronic device, in accordance with one or more example implementations of this disclosure.

FIG. 3 is a flowchart illustrating a method/process 300 for decoding and/or encoding video data by an electronic device, in accordance with one or more example implementations of this disclosure. The method/process 300 is an example implementation, as there may be a variety of mechanisms of decoding the video data.

The method/process 300 may be performed by an electronic device using the configurations illustrated in FIGS. 1 and/or 2, where various elements of these figures may be referenced to describe the method/process 300. Each block illustrated in FIG. 3 may represent one or more processes, methods, or subroutines performed by an electronic device.

The order in which the blocks appear in FIG. 3 is for illustration only, and may not be construed to limit the scope of the present disclosure, thus the order may be different from what is illustrated. Additional blocks may be added or fewer blocks may be utilized without departing from the scope of the present disclosure.

At block 310, the method/process 300 may start by receiving (e.g., via the decoder module 124, as shown in FIG. 2) the video data. The video data received by the decoder module 124 may include a bitstream.

With reference to FIGS. 1 and 2, the second electronic device 120 may receive the bitstream from an encoder, such as the first electronic device 110 (or other video providers) via the second interface 126. The second interface 126 may provide the bitstream to the decoder module 124.

At block 320, the decoder module 124 may determine a block unit from a current frame included in the video data.

With reference to FIGS. 1 and 2, the decoder module 124 may determine the image frames included in the bitstream when the video data received by the decoder module 124 is the bitstream. The current frame may be one of the image frames determined according to the bitstream. The decoder module 124 may further divide the current frame to determine the block unit according to the partition indications in the bitstream. For example, the decoder module 124 may divide the current frame to generate multiple CTUs, and may further divide a current CTU included in the CTUs to generate multiple divided blocks and to determine the block unit from the divided blocks, according to the partition indications (e.g., based on any video coding standard). The size of the block unit may be Wb×Hb. In some implementations, each of the Wb and Hb may be a positive integer (e.g., 4, 8, etc.) that may be equal to, or different from, each other.

At block 330, the decoder module 124 may determine a cross-component prediction (CCP) merge list of the block unit including multiple CCP merge candidates of the block unit. The CCP merge candidates of the block unit may be selected from multiple CCP predefined candidates.

Each of the CCP merge candidates of the block unit may correspond to one of multiple CCP candidate blocks of the block unit, and each of the CCP candidate blocks may have a corresponding one of multiple CCP candidate models used to predict and/or reconstruct the corresponding one of the CCP candidate blocks. Thus, each of the CCP merge candidates of the block unit may have a corresponding one of the CCP candidate models. In some implementations, the CCP predefined candidates may include at least one of multiple spatial adjacent CCP merge candidates, multiple spatial non-adjacent CCP merge candidates, multiple history-based CCP merge candidates, multiple temporal CCP merge candidates, or multiple default CCP merge candidates.

In some other implementations, the CCP predefined candidates may include at least one of the spatial adjacent CCP merge candidates, the spatial non-adjacent CCP merge candidates, the history-based CCP merge candidates, the temporal CCP merge candidates, multiple block-vector-based CCP merge candidates, or the default CCP merge candidates. Additional candidate types may be added or fewer candidate types may be utilized without departing from the scope of the present disclosure. When one of multiple CCP reference blocks, determined based on one of the CCP predefined candidates, is predicted using one of multiple cross-component model modes, the one of the CCP reference blocks may be selected as one of the CCP candidate blocks. In addition, a CCP prediction model of the one of the CCP reference blocks may be selected to be included in the CCP candidate models of the block unit to generate one of the CCP merge candidates included in the CCP merge list.

The CCP candidate models of the block unit may be the CCP prediction models used to predict and/or reconstruct a portion of the CCP reference blocks determined based on the CCP predefined candidates. The CCP prediction models may be determined using the cross-component model modes. The cross-component model modes may include at least one of multiple cross-component linear model (CCLM) prediction modes, multiple convolutional cross-component model (CCCM) prediction modes, and multiple gradient linear mode (GLM) prediction modes. The CCLM prediction modes may further include multiple single linear model (SLM) prediction modes and multiple multi-model linear model (MMLM) prediction modes. The CCCM prediction modes may further include multiple gradient and location CCCM (GL-CCCM) prediction modes, multiple non-down-sampled CCCM (NS-CCCM) prediction modes, and multiple multiple-down-sampled filters CCCM (MDF-CCCM) prediction modes. The GLM prediction modes may further include multiple luma sample with GLM (L-GLM) prediction modes.

The spatial adjacent CCP merge candidates may indicate multiple spatial adjacent CCP candidate blocks. Each of the spatial adjacent CCP candidate blocks may include at least one of multiple spatial adjacent CCP candidate samples. The spatial adjacent CCP candidate samples may be located, respectively, at one of multiple spatial adjacent CCP candidate positions. The spatial adjacent CCP candidate positions may include (x+Wb−1, y−1), (x−1, y+Hb−1), (x+Wb, y−1), (x−1, y+Hb), and (x−1, y−1), when a top-left corner of the block unit is located at a top-left position (x, y). When one of the spatial adjacent CCP candidate blocks is predicted using one of the cross-component model modes based on a CCP prediction model, the one of the spatial adjacent CCP candidate blocks may be selected as one of the CCP candidate blocks. In addition, the CCP prediction model of the one of the spatial adjacent CCP candidate blocks may be selected to be included in the CCP candidate models of the block unit to generate one of the CCP merge candidates in the CCP merge list.

The spatial non-adjacent CCP merge candidates may indicate multiple spatial non-adjacent CCP candidate blocks. Each of the spatial non-adjacent CCP candidate blocks may include at least one of multiple spatial non-adjacent CCP candidate samples. The spatial non-adjacent CCP candidate samples may be located, respectively, at one of multiple spatial non-adjacent CCP candidate positions. The spatial non-adjacent CCP candidate positions may include at least one of multiple spatial non-adjacent positions in an inter merge mode of a video coding standard. When one of the spatial non-adjacent CCP candidate blocks is predicted using one of the cross-component model modes based on a CCP prediction model, the one of the spatial non-adjacent CCP candidate blocks may be selected as one of the CCP candidate blocks. In addition, the CCP prediction model of the one of the spatial non-adjacent CCP candidate blocks may be selected to be included in the CCP candidate models of the block unit to generate one of the CCP merge candidates in the CCP merge list.

Multiple previous blocks reconstructed prior to the reconstruction of the block unit may be reconstructed based on multiple reconstruction schemes. When one of the previous blocks is reconstructed using one of the cross-component model modes based on a CCP prediction model, the CCP prediction model of the one of the previous blocks may be stored in a CCP model table on a first-in-first-out (FIFO) basis. The size of the CCP model table may be equal to Nt. In some implementations, Nt may be a positive integer, such as 6 or 12. In some implementations, the CCP model table may be reset at a beginning of each CTU row. When the block unit is being reconstructed, the CCP prediction models stored in the CCP model table may be selected to be included in the CCP candidate models of the block unit to generate the CCP merge candidates in the CCP merge list.

The temporal CCP merge candidates may indicate multiple temporal CCP candidate blocks. Each of the temporal CCP candidate blocks may include at least one of multiple temporal CCP candidate samples. The temporal CCP candidate samples may be located, respectively, at one of multiple temporal CCP candidate positions. The temporal CCP candidate positions may include multiple predefined locations of a reference picture in multiple reference picture lists. The reference picture lists may include a first reference picture list L0 and a second reference picture list L1.

In some implementations, the temporal CCP candidate positions may include multiple identical temporal positions in the inter merge mode of the video coding standard. When a particular one of the temporal CCP candidate blocks is predicted using one of the cross-component model modes based on a CCP prediction model, the particular temporal CCP candidate block may be selected as one of the CCP candidate blocks. In addition, the CCP prediction model of the particular temporal CCP candidate block may be selected to be included in the CCP candidate models of the block unit to generate one of the CCP merge candidates in the CCP merge list. In some implementations, the CCP prediction model of the temporal CCP candidate block corresponding to the first reference picture list L0 may be selected prior to selecting the CCP prediction model of the temporal CCP candidate block corresponding to the second reference picture list L1. Thus, with reference to FIGS. 1 and 2, after the decoder module 124 finishes checking whether the temporal CCP candidate blocks corresponding to the first reference picture list L0 have the CCP prediction model, the decoder module 124 may start to check the temporal CCP candidate blocks corresponding to the second reference picture list L1.

The block-vector-based CCP merge candidates may indicate multiple block-vector-based CCP candidate blocks. Each of the block-vector-based CCP candidate blocks may be indicated by a block candidate vector.

In some implementations, when luma samples of the block unit are reconstructed based on a luma block vector in an intra block copy (IBC) prediction mode of the video coding standard, the luma block vector may be used to derive the block candidate vector based on a scaling factor. Thus, the luma block vector of the block unit may be used to derive one of the block-vector-based CCP merge candidates. In some other implementations, when the luma samples of the block unit are reconstructed based on at least one luma intra template matching prediction (IntraTMP) candidate block in an IntraTMP prediction mode of the video coding standard, the at least one luma IntraTMP candidate block may be used to derive at least one luma IntraTMP block vector. In addition, the at least one luma IntraTMP block vector may be used to derive at least one block candidate vector based on the scaling factor. Thus, the at least one luma IntraTMP candidate block may be used to determine at least one of the block-vector-based CCP merge candidates. In some implementations, the scaling factor may be determined based on a video format. For example, if the video format is YUV422, the scaling factor may further include a width scaling factor equal to 2 and a height scaling factor equal to 1.

With reference to FIGS. 1 and 2, in yet other implementations, the decoder module 124 may determine a first chroma template region of the block unit, and may further search multiple chroma candidate blocks within a search range in the current frame. The decoder module 124 may further determine a chroma reference region for each of the chroma candidate blocks and determine a template cost value for each of the chroma reference regions. Each of the template cost values may be determined by calculating a difference between the block template region and a corresponding one of the chroma reference regions. The decoder module 124 may then select at least one of the chroma candidate blocks based on the template cost values, and may further determine at least one of the block-vector-based CCP merge candidates based on the at least one selected chroma candidate block. Since the first chroma template region and the chroma reference regions are reconstructed prior to the reconstruction of the block unit, the decoder module 124 may directly receive multiple reconstructed results of the first chroma template region and the chroma reference regions. In some implementations, the differences between the block template region and each of the chroma reference regions may be calculated based on one of a Mean Squared Error (MSE) calculation, a Sum of Absolute Difference (SAD) calculation, a Sum of Absolute Transformed Difference (SATD) calculation, and a mean-removed sum of absolute difference (MR-SAD) calculation.

When a particular one of the block-vector-based CCP candidate blocks is predicted using one of the cross-component model modes based on a CCP prediction model, the particular block-vector-based CCP candidate block may be selected as one of the CCP candidate blocks. In addition, the CCP prediction model of the particular block-vector-based CCP candidate block may be selected to be included in the CCP candidate models of the block unit to generate one of the CCP merge candidates in the CCP merge list.

A number of the CCP merge candidates may be equal to Nc. In some implementations, Nc may be a positive integer, such as 6 or 12. When the decoder module 124 checks whether the spatial adjacent CCP merge candidates, the spatial non-adjacent CCP merge candidates, the history-based CCP merge candidates, the temporal CCP merge candidates, and the block-vector-based CCP merge candidates are allowed to be added to the CCP merge candidates of the block unit, the decoder module 124 may also check whether the number of the added CCP merge candidates of the block unit is equal to Nc. When the number of the added CCP merge candidates of the block unit is equal to Nc, the decoder module 124 may bypass the checking and may stop adding the CCP predefined candidates to the CCP merge candidates.

However, in some implementations, after the decoder module 124 finishes checking whether the spatial adjacent CCP merge candidates, the spatial non-adjacent CCP merge candidates, the history-based CCP merge candidates, the temporal CCP merge candidates, and the block-vector-based CCP merge candidates may be allowed to be added to the CCP merge candidates of the block unit, the number of the added CCP merge candidates of the block unit may be still less than Nc. Thus, the decoder module 124 may add at least one of the default CCP merge candidates to the CCP merge candidates of the block unit. In some implementations, each of the default CCP merge candidates may include a coefficient set. Each of the coefficient sets may include a scaling coefficient and an offset coefficient. The scaling coefficient in each coefficient set may be selected from multiple scaling candidates, such as 0, 1, −1, 2, −2, 3, −3, 4, −4, 5, −5, or 6. The offset coefficient in each coefficient set may be selected from multiple offset candidate, such as 0, 1, −1, 2, −2, or 3. In some implementations, when the CCP candidate block indicated by the first one of the CCP merge candidates is reconstructed based on the SLM, the scaling candidates and the offset candidates may be derived based on the CCP candidate model of the first one of the CCP merge candidates.

Referring back to FIG. 3, at block 340, the decoder module 124 may select one of the multiple CCP merge candidates for the block unit to determine a prediction model of the selected CCP merge candidate.

With reference to FIGS. 1 and 2, the decoder module 124 may determine the prediction model for the block unit based on the CCP merge candidates of the block unit in multiple determination schemes. When one of the CCP merge candidates is selected for the block unit, the CCP candidate model of a specific one of the CCP candidate blocks corresponding to the selected CCP merge candidate may also be determined from the CCP candidate models as the prediction model. Specifically, the specific CCP candidate block corresponding to the selected CCP merge candidate may be a reference block predicted and/or reconstructed based on the prediction model.

In some implementations, the decoder module 124 may determine a first merge index from the bitstream. For example, the decoder module 124 may parse the first merge index from the bitstream. The first merge index may indicate a first one of the CCP merge candidates as the selected CCP merge candidate to determine the prediction model of the selected CCP merge candidate.

In some other implementations, the decoder module 124 may select one of the CCP merge candidates in the CCP merge list without parsing any index from the bitstream. For example, the decoder module 124 may determine a second chroma template region and a luma template region. The second chroma template region may neighbor a chroma block of the block unit, and the luma template region may neighbor a luma block of the block unit. The second chroma template region may be identical to or different from a first chroma template region. In addition, a size difference between the second chroma template region and the luma template region may be derived based on a scaling factor. In some implementations, the scaling factor may be determined based on a video format. For example, if the video format is YUV422, the scaling factor may further include a width scaling factor equal to 2 and a height scaling factor equal to 1.

Since the second chroma template region and the luma template region are reconstructed prior to the reconstruction of the block unit, the decoder module 124 may directly receive reconstructed results of the second chroma template region and the luma template region. The decoder module 124 may then predict the second chroma template region based on the reconstructed result of the luma template region by using each of the CCP candidate models to generate multiple predicted results of the second chroma template region. In addition, the decoder module 124 may compare the reconstructed result of the second chroma template region with each of the predicted results of the second chroma template region to generate the template cost values. The decoder module 124 may then select one of the CCP merge candidates in the CCP merge list directly based on the template cost values. In some implementations, the selected CCP merge candidate may correspond to the minimum of the template cost values.

The second chroma template region may include at least one of a left chroma region, an above chroma region, or an above-left chroma region. The chroma left region may be a first area located at a left side of the block unit, the above chroma region may be a second arca located above the block unit, and the above-left chroma region may be a third area located at a top-left side of the block unit. The left chroma region, the above chroma region, and the above-left chroma region may be reconstructed prior to the reconstruction of the block unit. In some implementations, the size of the second chroma template region may be determined based on the size of the block unit. The width of the above chroma region may be equal to Wb or 2 Wb, and the height of the above chroma region may be equal to a number S. The height of the left chroma region may be equal to Hb or 2 Hb, and the width of the left chroma region may be equal to S. The width and height of the above-left chroma region may be equal to S. In some implementations, S may be a positive integer, such as 3 or 6. The size of the luma template region may be determined based on the size of the chroma template region and the scaling factor. The scaling factor may be determined based on the video format.

Referring back to FIG. 3, at block 350, the decoder module 124 may predict the block unit using the prediction model of the selected CCP merge candidate to generate a first prediction block.

In some implementations, the block unit may inherit the prediction model of the reference block corresponding to the selected CCP merge candidate, which may result in the prediction model of the block unit being identical to the prediction model of the reference block. Thus, with reference to FIGS. 1 and 2, the decoder module 124 may predict the block unit using the prediction model of the block unit to generate the first prediction block.

The luma samples of the block unit may be reconstructed prior to the reconstruction of the chroma samples of the block unit. Thus, the decoder model 124 may determine the reconstructed luma samples of the block unit and may predict the chroma samples of the block unit based on the reconstructed luma samples using the prediction model of the block unit to generate the first prediction block.

In some implementations, the decoder module 124 may further refine the prediction model based on one of multiple model refinement modes, such as a slope refinement mode, to generate a refined prediction model. The decoder module 124 may then predict the block unit using the refined prediction model to generate the first prediction block. In some other implementations, the decoder module 124 may not refine the prediction model. Thus, the decoder module 124 may predict the block unit directly using the prediction model to generate the first prediction block.

At block 360, the decoder module 124 may predict the block unit using a CCP derived model to generate a second prediction block.

With reference to FIGS. 1 and 2, in some implementations, the decoder module 124 may determine a second merge index from the bitstream. For example, the decoder module 124 may parse the second merge index from the bitstream. The second merge index may indicate a second one of the CCP merge candidates as a second selected CCP merge candidate to determine a CCP merge model of the second selected CCP merge candidate. The second selected CCP merge candidate may correspond to a CCP merge block predicted and reconstructed based on the CCP merge model. The CCP derived model of the block unit may be inherited from the CCP merge model of the CCP merge block corresponding to the second selected CCP merge candidate. In some implementations, the cross-component model modes of the second selected CCP merge candidate indicated by the second merge index may be a multiple-model CCCM (MM-CCCM) mode.

In some other implementations, the decoder module 124 may select another one of the CCP merge candidates in the CCP merge list without parsing any index from the bitstream. For example, the decoder module 124 may determine the second selected CCP merge candidate in the CCP merge list directly based on the template cost values, each generated by comparing the reconstructed result of the second chroma template region with a corresponding one of the predicted results of the second chroma template region. In some implementations, the second selected CCP merge candidate may correspond to a second minimum of the template cost values. The second selected CCP merge candidate may correspond to a CCP merge block predicted and reconstructed based on the CCP merge model. The CCP derived model of the block unit may be inherited from the CCP merge model of the CCP merge block corresponding to the second selected CCP merge candidate. In some implementations, the cross-component model modes of the second selected CCP merge candidate selected based on the template cost values may be the MM-CCCM mode.

In yet other implementations, the decoder module 124 may determine a chroma neighboring region and a luma neighboring region. The chroma neighboring region may neighbor the chroma block of the block unit, and the luma neighboring region may neighbor the luma block of the block unit. The chroma neighboring region may be identical to or different from the first chroma template region and the second template region. In addition, a size difference between the chroma neighboring region and the luma neighboring region may be derived based on a scaling factor. In some implementations, the scaling factor may be determined based on a video format. For example, if the video format is YUV422, the scaling factor may further include a width scaling factor equal to 2 and a height scaling factor equal to 1. Since the chroma neighboring region and the luma neighboring region are reconstructed prior to the reconstruction of the block unit, the decoder module 124 may directly receive reconstructed results of the chroma neighboring region and the luma neighboring region. The decoder module 124 may then derive the CCP derived model based on the reconstructed results of the chroma neighboring region and the luma neighboring region. In some implementations, the cross-component model modes of the CCP derived model derived based on the reconstructed results of the chroma neighboring region and the luma neighboring region may be the MM-CCCM mode.

The luma samples of the block unit may be reconstructed prior to the reconstruction of the chroma samples of the block unit. Thus, the decoder model 124 may also determine the reconstructed luma samples of the block unit and predict the chroma samples of the block unit using the CCP derived model of the block unit based on the reconstructed luma samples to generate the second prediction block.

Referring back to FIG. 3, at block 370, the decoder module 124 may reconstruct the block unit based on the first prediction block and the second prediction block.

With reference to FIGS. 1 and 2, the decoder module 124 may weightedly combine the first prediction block and the second prediction block based on multiple weighting parameters to generate a weighted block. The weighting parameters may be derived based on multiple scheme. It should be noted that the derivation scheme of the weighting parameters may be changed without departing from the scope of the present disclosure.

In some implementations, the decoder module 124 may determine the weighting parameters without parsing any index or flag from the bitstream. The weighting parameters may be predefined. For examples, both of the two weighting parameters may be equal to 0.5. In some other implementations, the decoder module 124 may determine the weighting parameters based on two parameter indices in the bitstream for indicating the weighting parameters.

In some implementations, the decoder module 124 may further determine at least one third prediction block, each generated, respectively, based on different prediction schemes. Thus, when the weighting parameters are determined based on the parameter indices included in the bitstream, there may be more than two parameter indices included in the bitstream.

In some implementations, the weightedly combination for the CCP merge candidate may be regarded as a CCP merge fusion mode. In some implementations, a flag or an index may be signaled in the bitstream to indicate whether the CCP merge fusion mode is applied on the block unit.

In some implementations, the weightedly combination may be regarded as a CCP merge fusion mode. In some implementations, a CCP merge fusion flag may be determined from the bitstream to indicate whether the CCP merge fusion mode is applied on the block unit. Thus, the CCP merge fusion flag equal to one may specify that the block unit is reconstructed based on the first prediction block and the second prediction block of the block unit.

The decoder module 124 may reconstruct the block unit based on the weighted block. The decoder module 124 may determine multiple residual components from the bitstream for the block unit and add the residual components into the weighted block to reconstruct the block unit. The decoder module 124 may reconstruct all of the other block units in the image frame for reconstructing the image frame and the video. The method/process 300 may then end.

Figure 4:
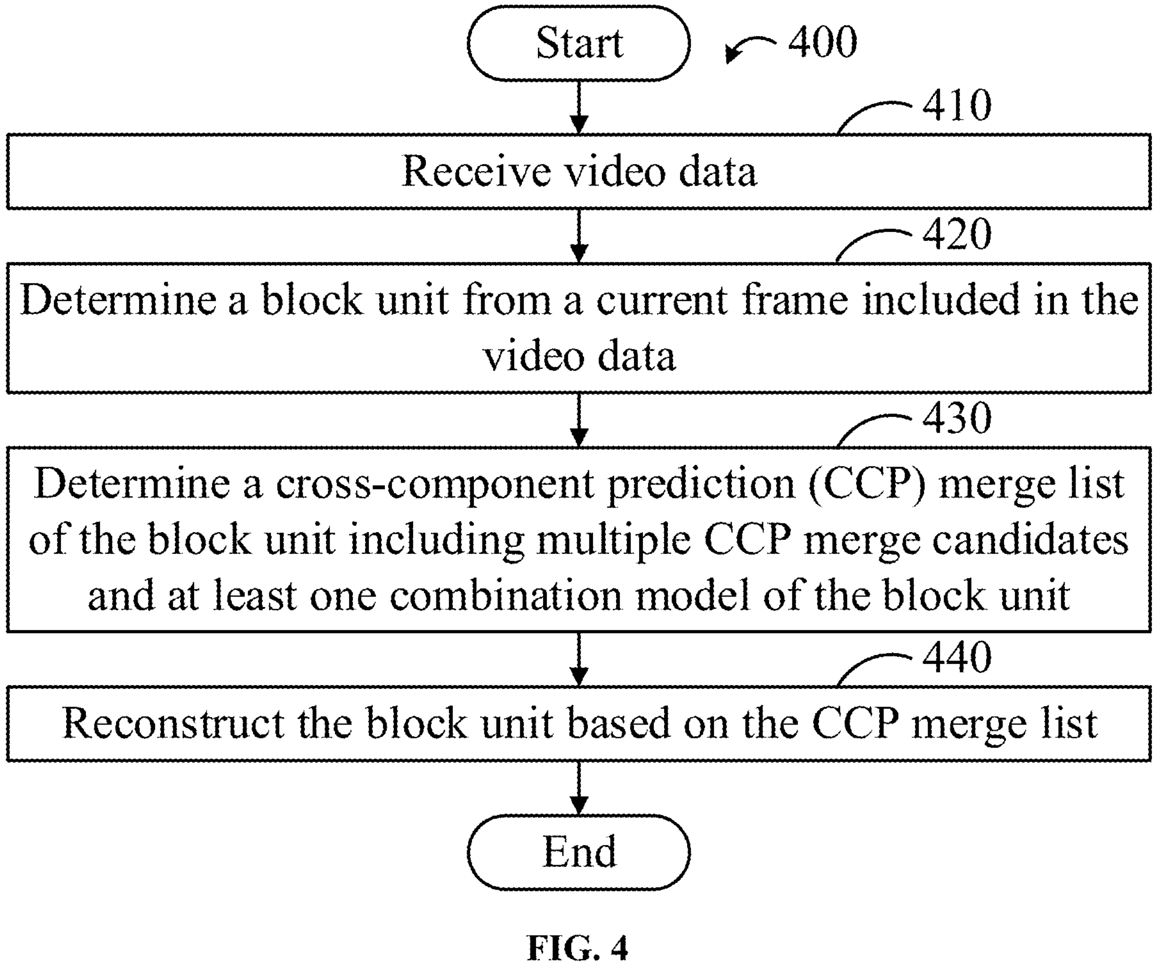
FIG. 4 is a flowchart illustrating a method/process for decoding and/or encoding video data by an electronic device, in accordance with one or more example implementations of this disclosure.

FIG. 4 is a flowchart illustrating a method/process 400 for decoding and/or encoding video data by an electronic device, in accordance with one or more example implementations of this disclosure. The method/process 400 is an example implementation, as there may be a variety of mechanisms of decoding the video data.

The method/process 400 may be performed by an electronic device using the configurations illustrated in FIGS. 1 and 2, where various elements of these figures may be referenced to describe the method/process 400. Each block illustrated in FIG. 4 may represent one or more processes, methods, or subroutines performed by an electronic device.

The order in which the blocks appear in FIG. 4 is for illustration only, and may not be construed to limit the scope of the present disclosure, thus the order may be different from what is illustrated. Additional blocks may be added or fewer blocks may be utilized without departing from the scope of the present disclosure.

At block 410, the method/process 400 may start by receiving (e.g., via the decoder module 124, as shown in FIG. 2) the video data. The video data received by the decoder module 124 may include a bitstream.

With reference to FIGS. 1 and 2, the second electronic device 120 may receive the bitstream from an encoder, such as the first electronic device 110 (or other video providers) via the second interface 126. The second interface 126 may provide the bitstream to the decoder module 124.

At block 420, the decoder module 124 may determine a block unit from a current frame included in the video data.

With reference to FIGS. 1 and 2, the decoder module 124 may determine the image frames included in the bitstream when the video data received by the decoder module 124 is the bitstream. The current frame may be one of the image frames determined according to the bitstream. The decoder module 124 may further divide the current frame to determine the block unit according to partition indications in the bitstream. For example, the decoder module 124 may divide the current frame to generate multiple CTUs, and further divide a current CTU included in the CTUs to generate multiple divided blocks and to determine the block unit from the divided blocks, according to the partition indications (e.g., based on any video coding standard). The size of the block unit may be Wb×Hb. In some implementations, each of the Wb and Hb may be a positive integer (e.g., 4, 8, etc.) that may be equal to, or different from, each other.

At block 430, the decoder module 124 may determine a cross-component prediction (CCP) merge list of the block unit including multiple CCP merge candidates and at least one combination candidate of the block unit.

With reference to FIGS. 1 and 2, the decoder module 124 may determine the CCP merge candidates of the block unit selected from multiple CCP predefined candidates.

Each of the CCP merge candidates of the block unit may correspond to one of multiple CCP candidate blocks of the block unit, and each of the CCP candidate blocks may have a corresponding one of multiple CCP candidate models used to predict and/or reconstruct the corresponding one of the CCP candidate blocks. Thus, each of the CCP merge candidates of the block unit may have a corresponding one of the CCP candidate models. In some implementations, the CCP predefined candidates may include at least one of multiple spatial adjacent CCP merge candidates, multiple spatial non-adjacent CCP merge candidates, multiple history-based CCP merge candidates, multiple temporal CCP merge candidates, or multiple default CCP merge candidates. In some other implementations, the CCP predefined candidates may include at least one of the spatial adjacent CCP merge candidates, the spatial non-adjacent CCP merge candidates, the history-based CCP merge candidates, the temporal CCP merge candidates, multiple block-vector-based CCP merge candidates, or the default CCP merge candidates. Additional candidate types may be added or fewer candidate types may be utilized without departing from the scope of the present disclosure. The CCP predefined candidates in the method/process 400 may be identical to those in the method/process 300.

When a particular one of multiple CCP reference blocks, determined based on one of the CCP predefined candidates, is predicted using one of multiple cross-component model modes, the particular CCP reference block may be selected as one of the CCP candidate blocks. In addition, a CCP prediction model of the particular CCP reference block may be selected to be included in the CCP candidate models of the block unit to generate one of the CCP merge candidates included in the CCP merge list. The selection of the CCP merge candidates from the CCP predefined candidates in the method/process 400 may be identical to that in the method/process 300.

The CCP candidate models of the block unit may be the CCP prediction models used to predict and/or reconstruct a portion of the CCP reference blocks determined based on the CCP predefined candidates. The CCP prediction models may be determined using the cross-component model modes. The cross-component model modes may include at least one of multiple CCLM prediction modes, multiple CCCM prediction modes, and multiple GLM prediction modes. The CCLM prediction modes may further include multiple SLM prediction modes and multiple MMLM prediction modes. The CCCM prediction modes may further include multiple GL-CCCM prediction modes, multiple NS-CCCM prediction modes, and multiple MDF-CCCM prediction modes. The GLM prediction modes may further include multiple L-GLM prediction modes. The cross-component model modes in the method/process 400 may be identical to those in the method/process 300.

In some implementations, the CCP merge list may further include the at least one combination candidate, each generated based on at least two of the CCP merge candidates of the block unit. The decoder module 124 may select at least two of the CCP merge candidates for the block unit to determine at least two CCP candidate models from the selected at least two CCP merge candidates for deriving one of the at least one combination candidate.

The decoder module 124 may compare the cross-component model modes of the CCP merge candidates with each other. When the cross-component model modes of a portion of the CCP merge candidates are identical to each other, the portion of the CCP merge candidates may be selected to determine a portion of the CCP candidate models from the portion of the CCP merge candidates for deriving one of the at least one combination candidate. For example, when the cross-component model mode of a first specific one of the CCP merge candidates is identical to the cross-component model mode of a second specific one of the CCP merge candidates, the first and the second specific CCP merge candidates may be selected to determine two CCP candidate models from the first and the second specific CCP merge candidates for deriving one of the at least one combination candidate. Furthermore, when the cross-component model mode of a third specific one of the CCP merge candidates is also identical to the cross-component model modes of the first and the second specific CCP merge candidates, the first to the third specific CCP merge candidates may be selected to determine three CCP candidate models from the first to the three specific CCP merge candidates for deriving one of the at least one combination candidate.

The number of the selected at least two CCP merge candidates may be equal to Ns. In some implementations, Ns may be a positive integer, such as 2, 3, 4, etc. Thus, when Ns cross-component model modes of the Ns CCP merge candidates are identical to each other, the Ns CCP merge candidates may be selected to determine Ns CCP candidate models from the Ns CCP merge candidates for deriving one of the at least one combination candidate. For example, when four cross-component model modes of four CCP merge candidates are the MMLM prediction mode, the four CCP merge candidates may be selected to determine four CCP candidate models of the four CCP merge candidates. As another example, when three cross-component model modes of three CCP merge candidates are the GL-CCCM prediction mode, the three CCP merge candidates may be selected to determine three CCP candidate models of the three CCP merge candidates.

In some implementations, the decoder module 124 may only compare Nm cross-component model modes of the first Nm of the CCP merge candidates with each other. Nm may be less than Nc of the CCP merge candidates. In some implementations, Nm may be a positive integer, such as 2, 3, 4, etc. For example, the decoder module 124 may only compare three cross-component model modes of the first three of the CCP merge candidates with each other. When two of the three cross-component model modes of the first three CCP merge candidates are identical to each other, two CCP merge candidates corresponding to the two of the three cross-component model modes may be selected to determine two CCP candidate models from the selected two CCP merge candidates for deriving one of the at least one combination candidate. In addition, when each of the three cross-component model modes of the first three CCP merge candidates are identical to each other, the first three CCP merge candidates may be selected to determine three CCP candidate models from the selected three CCP merge candidates for deriving one of the at least one combination candidate.

The decoder module 124 may derive, for the block unit, a combination model for one of the at least one combination candidate based on the at least two CCP candidate models and add the combination candidate into the CCP merge list. The decoder module 124 may determine multiple model coefficients for each of the at least two CCP candidate models and then derive multiple model coefficients of the combination model based on the model coefficients of the at least two CCP candidate models. Thus, the cross-component model mode of the combination candidate may be identical to the cross-component model modes of the selected at least two CCP merge candidates. The number of the model coefficients of the combination model may also be identical to the number of the model coefficients for each of the at least two CCP candidate models.

The combination model may include only one combined model when the cross-component model mode of the combination candidate is one of multiple single-model cross-component prediction modes. In addition, the combination model may include two combined models when the cross-component model mode of the combination candidate is one of multiple multiple-model cross-component prediction modes. Thus, the number of the model coefficients of the combination model may be equal to M, when the cross-component model mode of the combination candidate is one of the single-model cross-component prediction modes. In addition, the number of the model coefficients of the combination model may be equal to 2M, when the cross-component model mode of the combination candidate is one of the multiple-model cross-component prediction modes. In some implementations, M may be a positive integer, such as 2, 3, 4, 5, 6, 7, etc.

The single-model cross-component prediction modes may include the CCLM prediction mode, the GLM prediction mode, the CCCM prediction mode, the GL-CCCM prediction mode, the NS-CCCM prediction mode, and the MDF-CCCM prediction mode. In addition, the multiple-model cross-component prediction modes may include the MMLM prediction mode, a multiple-model GLM (MM-GLM) prediction mode, a multiple-model CCCM (MM-CCCM) prediction mode, a multiple-model GL-CCCM (MM-GL-CCCM) prediction mode, a multiple-model NS-CCCM (MM-NS-CCCM) prediction mode, and a multiple-model MDF-CCCM (MM-MDF-CCCM) prediction mode.

Each of the model coefficients of the combination model may be derived by averaging at least two corresponding model coefficients of the model coefficients in the at least two CCP candidate models. For example, a K-th one of the model coefficients of the combination model may be derived by averaging a K-th one of the model coefficients for each of the at least two CCP candidate models. In some implementations, K which is less than or equal to M may be a positive integer, such as 2, 3, 4, 5, 6, 7, etc. When Ns of the selected at least two of the CCP merge candidates is equal to three, the K-th model coefficient of the combination model may be derived by averaging the K-th model coefficient of a first one of the selected CCP merge candidates, the K-th model coefficient of a second one of the selected CCP merge candidates, and the K-th model coefficient of a last one of the selected CCP merge candidates.

In some implementations, the cross-component model mode of the combination candidate is one of the single-model cross-component prediction modes. Each of the combination model and the at least two CCP candidate models may include, respectively, only one combined model. The combination model may include the model coefficients $$C_0^c, C_1^c,$$

. . . , $$C_{M-2}^c,$$

and $$C_{M-1}^c$$

of the combined model. Thus, each of the model coefficients $$C_0^c, C_1^c,$$

. . . , $$C_{M-2}^c,$$

and $$C_{M-1}^c$$

may be derived by averaging at least two corresponding model coefficients of the model coefficients in the at least two CCP candidate models. For example, when Ns of the selected at least two of the CCP merge candidates is equal to three, the first selected CCP merge candidate may include the model coefficients $$C_0^1, C_1^1,$$

. . . , $$C_{M-2}^1,$$

and $$C_{M-1}^1.$$

In addition, the second selected CCP merge candidate may include the model coefficients $$C_0^2, C_1^2,$$

. . . , $$C_{M-2}^2,$$

and $$C_{M-1}^2,$$

and the last selected CCP merge candidate may include the model coefficients $$C_0^3, C_1^3,$$

. . . , $$C_{M-2}^3,$$

and $$C_{M-1}^3.$$

Thus, the K-th model coefficient $$C_{K-1}^c$$

of the combination model may be derived by averaging the three corresponding model coefficients $$C_{K-1}^1, C_{K-1}^2,$$

and $$C_{K-1}^3.$$

In some other implementations, the cross-component model mode of the combination candidate is one of the multiple-model cross-component prediction modes. Each of the combination model and the at least two CCP candidate models may include, respectively, two combined models and a luma averaged value. Thus, the combination model may include multiple model coefficients $$C_0^{c1}, C_1^{c1},$$

. . . , $$C_{M-2}^{c1},$$

and $$C_{M-1}^{c1}$$

of a first combined model, multiple model coefficients $$C_0^{c2}, C_1^{c2},$$

. . . , $$C_{M-2}^{c2},$$

and $$C_{M-1}^{c2}$$

of a second combined model, and a luma averaged value $A_c$. Each of the model coefficients $$C_0^{c1}, C_1^{c1},$$

. . . , $$C_{M-2}^{c1},$$

and $$C_{M-1}^{c1}$$

of the first combined model may be derived by averaging at least two corresponding model coefficients, each included in the first combined models of the at least two CCP candidate models. Each of the model coefficients $$C_0^{c2}, C_1^{c2},$$

. . . , $$C_{M-2}^{c2},$$

and $$C_{M-1}^{c2}$$

of the second combined model may be derived by averaging at least two corresponding model coefficients, each included in the second combined models of the at least two CCP candidate models. In addition, the luma averaged value $A_c$ of the combination model may be derived by averaging the luma averaged values of the at least two CCP candidate models. For example, Ns of the selected at least two of the CCP merge candidates is equal to two. The K-th model coefficient $$C_{K-1}^{c1}$$

of the first combined model of the combination model may be derived by averaging the K-th model coefficient $$C_{K-1}^{11}$$

of the first combined model in the first selected CCP merge candidate and the K-th model coefficient $$C_{K-1}^{21}$$

of the first combined model in the second selected CCP merge candidate. The K-th model coefficient $$C_{K-1}^{c2}$$

of the second combined model of the combination model may be derived by averaging the K-th model coefficient $$C_{K-1}^{12}$$

of the second combined model in the first selected CCP merge candidate and the K-th model coefficient $$C_{K-1}^{22}$$

of the second combined model in the second selected CCP merge candidate. In addition, the luma averaged value $A_c$ of the combination model may be derived by averaging the luma averaged value $A_1$ of the first selected CCP merge candidate and the luma averaged value $A_2$ of the second selected CCP merge candidate. In some implementations, the average calculation may include a shift operation. For example, the average calculation of the luma averaged value $A_1$ and the luma averaged value $A_2$ may be shown in the following function:

$$A_c = (A_1 + A_2 + 1) \gg 1$$

In some implementations, the at least one combination candidate may be derived after the CCP merge list has been constructed. In some other implementations, the at least one combination candidate may be derived when the CCP merge list is being constructed. For example, in some implementations, the at least one combination CCP merge candidate may be collected after the decoder modules 124 finishes checking whether the history-based CCP merge candidates are allowed to be added to the CCP merge candidates of the block unit. In some other implementations, the at least one combination candidate may be derived after the decoder modules 124 finishes checking whether the temporal CCP merge candidates are allowed to be added to the CCP merge candidates of the block unit. In some implementations, a pruning operation may be applied when the at least one combination candidate is derived. In some other implementations, the pruning operation may not be applied when the at least one combination candidate is derived.

In some implementations, the at least one combination candidate and the CCP merge candidates may be reordered when the at least one combination candidate is added into the CCP merge list. In some implementations, the reordering process may be based on multiple template cost values. In some implementations, the decoder module 124 may determine a second chroma template region and a luma template region. The second chroma template region may neighbor a chroma block of the block unit, and the luma template region may neighbor a luma block of the block unit. The size of the second chroma template region may be identical to or different from the size of the first chroma template region. The sizes of the second chroma template region and the luma template region in the method/process 400 may be identical to those in the method/process 300. Since the second chroma template region and the luma template region are reconstructed prior to the reconstruction of the block unit, the decoder module 124 may directly receive reconstructed results of the second chroma template region and the luma template region. The decoder module 124 may then predict the second chroma template region based on the reconstructed result of the luma template region by using each of the at least one combination model and the CCP candidate models to generate multiple predicted results of the second chroma template region. In addition, the decoder module 124 may compare the reconstructed result of the second chroma template region with each of the predicted results of the second chroma template region to generate the template cost values. The at least one combination candidate and the CCP merge candidates may be reordered in the ascending order of the template cost values.

In some implementations, a model refinement process of the CCP merge candidates may be performed. In some implementations, the model refinement process may be performed before the reordering process. In some other implementations, the refinement process may be performed after the reordering process.

Referring back to FIG. 4, at block 440, the decoder module 124 may reconstruct the block unit based on the CCP merge list.

With reference to FIGS. 1 and 2, the decoder module 124 may select one of the CCP merge candidates and the at least one combination candidate in the CCP merge list to determine a prediction model of the selected candidate. In some implementations, the decoder module 124 may determine a merge index from the bitstream. For example, the decoder module 124 may parse the merge index from the bitstream. The merge index may indicate the one of the CCP merge candidates and the at least one combination candidate to determine the prediction model of the selected candidate.

In some other implementations, the decoder module 124 may select one of the CCP merge candidates and the at least one combination candidate in the CCP merge list without parsing any index from the bitstream. For example, the decoder module 124 may predict the second chroma template region based on the reconstructed result of the luma template region by using each of the at least one combination model and the CCP candidate models to generate the predicted results of the second chroma template region. The decoder module 124 may then select one of the CCP merge candidates and the at least one combination candidate in the CCP merge list directly based on the template cost values generated by comparing the reconstructed result of the second chroma template region with each of the predicted results of the second chroma template region.

When the selected candidate is a particular one of the CCP merge candidates, the prediction model may be inherited from a specific one of the CCP candidate models used to predict a reference block corresponding to the particular CCP merge candidate. In addition, when the selected candidate is one of the at least one combination candidate, the prediction model may be the combination model derived based on the at least two CCP candidate models of the selected at least two CCP merge candidate.

In some implementations, the decoder module 124 may predict the block unit using the prediction model of the selected candidate based on the reconstructed result of the luma template region to generate a prediction block, and then reconstruct the block unit based on the prediction block. The decoder module 124 may determine multiple residual components from the bitstream for the block unit and add the residual components into the prediction block to reconstruct the block unit. The decoder module 124 may reconstruct all of the other block units in the image frame for reconstructing the image frame and the video.

In some implementations, the decoder module 124 may predict the block unit using the prediction model of the selected candidate based on the reconstructed result of the luma template region to generate a first prediction block. In addition, the decoder module 124 may further predict the block unit using a CCP derived model to generate a second prediction block. The generation of the second prediction block at block 440 may be identical to that at block 360. The decoder module 124 may then reconstruct the block unit based on the first prediction block and the second prediction block. The reconstruction of the block unit at block 440 may be identical to that at block 370 when the block unit is predicted by weightedly combining the first prediction block and the second prediction block. In some implementations, the cross-component model modes of the CCP derived model may be the MM-CCCM prediction mode. The method/process 400 may then end.

Figure 5:
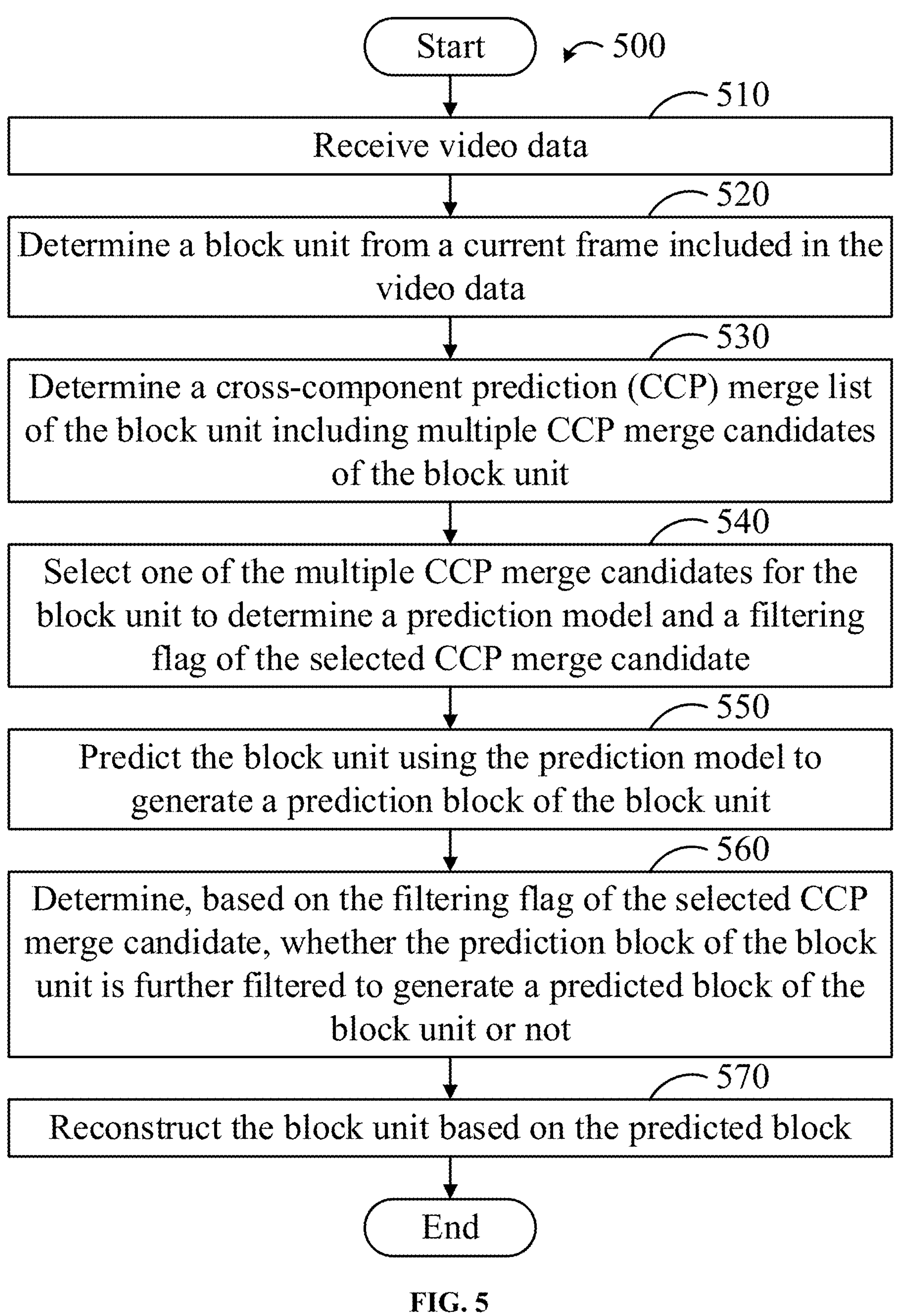
FIG. 5 is a flowchart illustrating a method/process for decoding and/or encoding video data by an electronic device, in accordance with one or more example implementations of this disclosure.

FIG. 5 is a flowchart illustrating a method/process 500 for decoding and/or encoding video data by an electronic device, in accordance with one or more example implementations of this disclosure. The method/process 500 is an example implementation, as there may be a variety of mechanisms of decoding the video data.

The method/process 500 may be performed by an electronic device using the configurations illustrated in FIGS. 1 and 2, where various elements of these figures may be referenced to describe the method/process 500. Each block illustrated in FIG. 5 may represent one or more processes, methods, or subroutines performed by an electronic device.

The order in which the blocks appear in FIG. 5 is for illustration only, and may not be construed to limit the scope of the present disclosure, thus the order may be different from what is illustrated. Additional blocks may be added or fewer blocks may be utilized without departing from the scope of the present disclosure.

At block 510, the method/process 500 may start by receiving (e.g., via the decoder module 124, as shown in FIG. 2) the video data. The video data received by the decoder module 124 may include a bitstream.

With reference to FIGS. 1 and 2, the second electronic device 120 may receive the bitstream from an encoder, such as the first electronic device 110 (or other video providers) via the second interface 126. The second interface 126 may provide the bitstream to the decoder module 124.

At block 520, the decoder module 124 may determine a block unit from a current frame included in the video data.

With reference to FIGS. 1 and 2, the decoder module 124 may determine the image frames included in the bitstream when the video data received by the decoder module 124 is the bitstream. The current frame may be one of the image frames determined according to the bitstream. The decoder module 124 may further divide the current frame to determine the block unit according to the partition indications in the bitstream. For example, the decoder module 124 may divide the current frame to generate multiple CTUs, and may further divide a current CTU included in the CTUs to generate multiple divided blocks and to determine the block unit from the divided blocks, according to the partition indications (e.g., based on any video coding standard). The size of the block unit may be Wb×Hb. In some implementations, each of the Wb and Hb may be a positive integer (e.g., 4, 8, etc.) that may be equal to, or different from, each other.

At block 530, the decoder module 124 may determine a cross-component prediction (CCP) merge list of the block unit including multiple CCP merge candidates of the block unit. The CCP merge candidates of the block unit may be selected from multiple CCP predefined candidates.

Each of the CCP merge candidates of the block unit may correspond to one of multiple CCP candidate blocks of the block unit, and each of the CCP candidate blocks may have a corresponding one of multiple CCP candidate models used to predict and/or reconstruct the corresponding one of the CCP candidate blocks. Thus, each of the CCP merge candidates of the block unit may have a corresponding one of the CCP candidate models. In some implementations, the CCP predefined candidates may include at least one of multiple spatial adjacent CCP merge candidates, multiple spatial non-adjacent CCP merge candidates, multiple history-based CCP merge candidates, multiple temporal CCP merge candidates, or multiple default CCP merge candidates. In some other implementations, the CCP predefined candidates may include at least one of the spatial adjacent CCP merge candidates, the spatial non-adjacent CCP merge candidates, the history-based CCP merge candidates, the temporal CCP merge candidates, multiple block-vector-based CCP merge candidates, or the default CCP merge candidates. Additional candidate types may be added or fewer candidate types may be utilized without departing from the scope of the present disclosure.

When a particular one of multiple CCP reference blocks, determined based on one of the CCP predefined candidates, is predicted using one of multiple cross-component model modes, the particular CCP reference block may be selected as one of the CCP candidate blocks. In addition, a CCP prediction model of the particular CCP reference block may be selected to be included in the CCP candidate models of the block unit to generate one of the CCP merge candidates included in the CCP merge list. The selection of the CCP merge candidates from the CCP predefined candidates in the method/process 500 may be identical to that in the method/process 300.

The CCP candidate models of the block unit may be the CCP prediction models used to predict and/or reconstruct a portion of the CCP reference blocks determined based on the CCP predefined candidates. The CCP prediction models may be determined using the cross-component model modes. The cross-component model modes may include at least one of multiple CCLM prediction modes, multiple CCCM prediction modes, and multiple GLM prediction modes. The CCLM prediction modes may further include multiple SLM prediction modes and multiple MMLM prediction modes. The CCCM prediction modes may further include multiple GL-CCCM prediction modes, multiple NS-CCCM prediction modes, and multiple MDF-CCCM prediction modes. The GLM prediction modes may further include multiple L-GLM prediction modes. The cross-component model modes in the method/process 500 may be identical to those in the method/process 300.

In some implementations, the CCP merge list may further include one or more combination candidates, each generated based on at least two of the CCP merge candidates of the block unit. The decoder module 124 may select at least two of the CCP merge candidates for the block unit to determine at least two CCP candidate models of the selected at least two CCP merge candidates for deriving one of the one or more combination candidates. The derivation of the combination candidate in the method/process 500 may be identical to that in the method/process 400. In some implementations, the one or more combination candidates may be derived after the CCP merge list has been constructed. In some other implementations, the one or more combination candidates may be derived when the CCP merge list is being constructed. For example, in some implementations, the at least one combination CCP merge candidate may be collected after the decoder modules 124 finishes checking whether the history-based CCP merge candidates are allowed to be added to the CCP merge candidates of the block unit. In some other implementations, the one or more combination candidates may be derived after the decoder modules 124 finishes checking whether the temporal CCP merge candidates are allowed to be added to the CCP merge candidates of the block unit.

In some other implementations, the decoder module 124 may bypass deriving the one or more combination candidates, which may result in the combination candidate excluded from the CCP merge list.

Referring back to FIG. 5, at block 540, the decoder module 124 may select one of the multiple CCP merge candidates for the block unit to determine a prediction model and a filtering flag of the selected CCP merge candidate.

With reference to FIGS. 1 and 2, the decoder module 124 may determine the prediction model for the block unit based on the CCP merge candidates of the block unit in multiple determination schemes. When one of the CCP merge candidates is selected for the block unit, the CCP candidate model of a specific one of the CCP candidate blocks corresponding to the selected CCP merge candidate may also be determined from the CCP candidate models. Specifically, the specific CCP candidate block corresponding to the selected CCP merge candidate may be a reference block predicted and/or reconstructed based on the prediction model.

In some implementations, the decoder module 124 may determine a merge index from the bitstream. For example, the decoder module 124 may parse the merge index from the bitstream. In some implementations, the merge index may indicate one of the CCP merge candidates to determine the prediction model and the filtering flag of the selected CCP merge candidate. In some other implementations, the merge index may indicate one of the CCP merge candidates and the one or more combination candidates to determine the prediction model and the filtering flag of the selected candidate when the one or more combination candidates are also included in the CCP merge list.

In some other implementations, the decoder module 124 may select one of the CCP merge candidates in the CCP merge list without parsing any index from the bitstream. In yet other implementations, the decoder module 124 may select one of the CCP merge candidates and the one or more combination candidates in the CCP merge list without parsing any index from the bitstream.

In some implementations, the decoder module 124 may determine a second chroma template region and a luma template region when the one or more combination candidates are included in or excluded from the CCP merge list. The second chroma template region may neighbor a chroma block of the block unit, and the luma template region may neighbor a luma block of the block unit. The second chroma template region may be identical to or different from a first chroma template region. The sizes of the second chroma template region and the luma template region in the method/process 500 may be identical to those in the method/process 300. Since the second chroma template region and the luma template region are reconstructed prior to the reconstruction of the block unit, the decoder module 124 may directly receive reconstructed results of the second chroma template region and the luma template region. In some implementations, the decoder module 124 may then predict the second chroma template region based on the reconstructed result of the luma template region by using each of the CCP candidate models to generate multiple predicted results of the second chroma template region. In some other implementations, the decoder module 124 may then predict the second chroma template region based on the reconstructed result of the luma template region by using each of the CCP candidate models and the one or more combination candidates to generate multiple predicted results of the second chroma template region. The decoder module 124 may compare the reconstructed result of the second chroma template region with each of the predicted results of the second chroma template region to generate the template cost values. The decoder module 124 may then select one of the CCP merge candidates in the CCP merge list directly based on the template cost values. For example, the selected CCP merge candidate may correspond to the minimum of the template cost values. In some implementations, the second chroma template region may be identical to the first chroma template region at block 330 and block 530. In some other implementations, the second chroma template region may be different from the first chroma template region at block 330 and block 530.

In some other implementations, the decoder module 124 may determine a third chroma template region of the block unit and determine a chroma reference region for each of the CCP candidate blocks when the one or more combination candidates are excluded from the CCP merge list. The decoder module 124 may then determine multiple template cost values by comparing each of the chroma reference regions of the CCP candidate blocks with the third chroma template region of the block unit. Thus, the decoder module 124 may determine the selected CCP merge candidate based on the template cost values, and further determine the CCP candidate model and the filtering flag of the selected CCP merge candidate. In addition, the decoder module 124 may determine the CCP candidate model of the selected CCP merge candidate as the prediction model. It should be noted that the scheme for determining the selected CCP merge candidate may be changed without departing from the scope of the present disclosure. In some implementations, the third chroma template region may be identical to at least one of the first chroma template region at block 330 and block 530 and the second template region. In some other implementations, the second chroma template region may be different from each of the first chroma template region at block 330 and block 530 and the second template region.

The prediction model of the selected CCP merge candidate may be used to predict a reference block corresponding to the selected CCP merge candidate and determined from the CCP candidate blocks. After the reference block corresponding to the selected CCP merge candidate is predicted using the prediction model to generate a CCP reference prediction, the decoder module 124 may reconstruct the reference block corresponding to the selected CCP merge candidate based on the CCP reference prediction. Since each of the CCP candidate blocks corresponding to each of the CCP merge candidates has a corresponding one of the CCP candidate models, the selected CCP merge candidate may have a specific one of the CCP candidate models as the prediction model.

The filtering flag of the selected CCP merge candidate may be used to determine whether the CCP reference prediction is further filtered after the reference block corresponding to the selected CCP merge candidate is predicted using the prediction model to generate the CCP reference prediction. The filtering flag of the selected CCP merge candidate equal to one may specify that the CCP reference prediction is further filtered after the reference block corresponding to the selected CCP merge candidate is predicted using the prediction model of the selected CCP merge candidate. The filtering flag of the selected CCP merge candidate equal to zero may specify that the CCP reference prediction is not further filtered after the reference block corresponding to the selected CCP merge candidate is predicted using the CCP prediction model to generate the CCP reference prediction.

The filtering flag of the selected CCP merge candidate may be used to determine whether the CCP reference prediction is further filtered by a low-pass filter after the reference block corresponding to the selected CCP merge candidate is predicted using the prediction model to generate the CCP reference prediction. The CCP reference prediction of the reference block may include multiple predicted CCP reference samples, included in the reference block, generated by predicting using the prediction model. The low-pass filter may be a filter used for filtering the CCP reference prediction based on the predicted CCP reference samples. If a specific one of the predicted CCP reference samples neighbors a boundary of the reference block, the specific predicted CCP reference sample may be filtered with reconstructed neighboring samples neighboring the reference block. If the specific predicted CCP reference sample is far from the boundary of the reference block, the specific predicted CCP reference sample may be filtered only based on the predicted CCP reference samples.

In some implementations, the low-pass filter may be a local-boosting filter. The filtering flag of the selected CCP merge candidate may be a ccFilter flag indicating whether the CCP reference prediction is further filtered by the local-boosting filter. In other words, when the filtering flag of the selected CCP merge candidate is equal to one, the CCP reference prediction may be further filtered by the local-boosting filter after the reference block corresponding to the selected CCP merge candidate is predicted using the prediction model. When the filtering flag of the selected CCP merge candidate is equal to zero, the CCP reference prediction may not be further filtered by the local-boosting filter.

In some implementations, the filtering flag of the selected CCP merge candidate may be determined from the bitstream for determining whether the CCP reference prediction of the selected CCP merge candidate may be further filtered, when a cross-component model mode of the prediction model of the selected CCP merge candidate is one of multiple multiple-model cross-component prediction modes. In addition, the filtering flag of the selected CCP merge candidate may be determined to be equal to zero without parsing the video data for determining that the CCP reference prediction of the selected CCP merge candidate may not be filtered, when the cross-component model mode of the prediction model of the selected CCP merge candidate is different from each of the multiple-model cross-component prediction modes. In some other implementations, the filtering flag of the selected CCP merge candidate may be inherited from a reference CCP merge candidate of the reference block, when the prediction model of the selected CCP merge candidate is also determined from a CCP merge list of the reference block.

In some implementations, the multiple-model cross-component prediction modes may include the MMLM prediction mode, the MM-GLM prediction mode, the MM-CCCM prediction mode, the MM-GL-CCCM prediction mode, the MM-NS-CCCM prediction mode, and the MM-MDF-CCCM prediction mode. In addition, when the cross-component model mode of the prediction model of the selected CCP merge candidate is different from each of the multiple-model cross-component prediction modes, the cross-component model mode of the prediction model of the selected CCP merge candidate may be one of multiple single-model cross-component prediction modes.

When one of the one or more combination candidates included in the CCP merge list is selected, the filtering flag of the selected combination candidate may be determined based on at least two filtering flags of the selected at least two CCP merge candidates. In some implementations, the filtering flag of the selected combination candidate may be identical to a first one of the at least two filtering flags. In some implementations, the filtering flag of the selected combination candidate may be identical to a last one of the at least two filtering flags. In some implementations, the filtering flag of the selected combination candidate may be equal to one, when each of the at least two filtering flags is equal to one. Thus, the filtering flag of the selected combination candidate may be equal to zero, when one of the at least two filtering flags is equal to zero. In some implementations, the filtering flag of the selected combination candidate may be equal to one, when one of the at least two filtering flags is equal to one. Thus, the filtering flag of the selected combination candidate may be equal to zero, when each of the at least two filtering flags is equal to zero. In some other implementations, the filtering flag of the selected combination candidate may be predefined to be equal to one. In yet other implementations, the filtering flag of the selected combination candidate may be predefined to be equal to zero.

Referring back to FIG. 5, at block 550, the decoder module 124 may predict the block unit using the prediction model to generate a prediction block of the block unit.

In some implementations, the block unit may inherit the prediction model of the reference block corresponding to the selected CCP merge candidate, which may result in the prediction model of the block unit being identical to the prediction model of the reference block. Thus, with reference to FIGS. 1 and 2, the decoder module 124 may predict the block unit using the prediction model of the block unit to generate the prediction block.

The luma samples of the block unit may be reconstructed prior to the reconstruction of the chroma samples of the block unit. Thus, the decoder model 124 may determine the reconstructed luma samples of the block unit and may predict the chroma samples of the block unit based on the reconstructed luma samples by using the prediction model of the block unit to generate the prediction block.

In some implementations, the decoder module 124 may further refine the prediction model based on one of multiple model refinement modes, such as a slope refinement mode, to generate a refined prediction model. The decoder module 124 may then predict the block unit using the refined prediction model to generate the first prediction block. In some other implementations, the decoder module 124 may not refine the prediction model. Thus, the decoder module 124 may predict the block unit directly using the prediction model to generate the first prediction block.

At block 560, the decoder module 124 may determine, based on the filtering flag of the selected CCP merge candidate, whether the prediction block of the block unit is further filtered to generate a predicted block of the block unit or not. In some implementations, the prediction block of the block unit may be filtered by the low-pass filter, such as the local-boosting filter.

With reference to FIGS. 1 and 2, the decoder module 124 may determine, based on a filtering flag of the block unit, whether the prediction block of the block unit is further filtered to generate the predicted block of the block unit after the block unit is predicted using the prediction model to generate the prediction block. In addition, when the prediction block of the block unit is not filtered, the prediction block of the block unit may be directly regarded as the predicted block of the block unit.

In some implementations, the filtering flag of the block unit may be directly inherited from the filtering flag of the selected CCP merge candidate. The filtering flag of the selected CCP merge candidate may be determined from the bitstream as the filtering flag of the block unit when the cross-component model mode of the prediction model of the selected CCP merge candidate is one of the multiple-model cross-component prediction modes. Thus, the filtering flag of the selected CCP merge candidate may be determined from the bitstream for determining whether the prediction block of the block unit is further filtered when the cross-component model mode of the prediction model of the selected CCP merge candidate is one of the multiple-model cross-component prediction modes. In addition, the filtering flag of the selected CCP merge candidate may be predefined to be equal to zero without parsing the video data when the cross-component model mode of the prediction model of the selected CCP merge candidate is different from each of the multiple-model cross-component prediction modes. Thus, the filtering flag of the block unit inherited from the filtering flag of the selected CCP merge candidate may be directly determined to be equal to zero without parsing the video data for determining that the prediction block of the block unit is not filtered when the cross-component model mode of the prediction model of the selected CCP merge candidate is different from each of the multiple-model cross-component prediction modes.

In some other implementations, the filtering flag of the block unit may be directly inherited from the filtering flag of the selected CCP merge candidate when the cross-component model mode of the prediction model of the selected CCP merge candidate is one of the multiple-model cross-component prediction modes. However, the filtering flag of the block unit may be determined based on other schemes when the cross-component model mode of the prediction model of the selected CCP merge candidate is different from the multiple-model cross-component prediction modes.

In some implementations, the decoder module 124 may predict the second chroma template region based on the reconstructed result of the luma template region by using the prediction model of the selected CCP merge candidate to generate a first predicted results of the second chroma template region. Then, the decoder module 124 may filter the first predicted result of the second chroma template region by the low-pass filter to generate a second predicted result of the second chroma template region. The decoder module 124 may compare both the first predicted result and the second predicted result with the reconstructed result of the second chroma template region to generate template cost values.

The filtering flag of the block unit may be determined based on the template cost values when the cross-component model mode of the prediction model of the selected CCP merge candidate is different from the multiple-model cross-component prediction modes. When the template cost value of the unfiltered result (e.g., the first predicted result) is less than or equal to the template cost value of the filtered result (e.g., the second predicted result), the filtering flag of the block unit may be equal to zero. When the template cost value of the unfiltered result (e.g., the first predicted result) is greater than the template cost value of the filtered result (e.g., the second predicted result), the filtering flag of the block unit may be equal to one. In some other implementations, the decoder module 124 may directly determine the filtering flag of the block unit from the bitstream when the cross-component model mode of the prediction model of the selected CCP merge candidate is different from the multiple-model cross-component prediction modes.

In some other implementations, the filtering flag of the block unit may be determined based on the template cost values of the unfiltered result and the filtered result when the prediction model of the block unit is determined based on the CCP merge list. In some other implementations, the filtering flag of the block unit may be predefined to be equal to one when the prediction model of the block unit is determined based on the CCP merge list. In yet other implementations, the filtering flag of the block unit may be determined based on a high-level syntax corresponding to the block unit when the prediction model of the block unit is determined based on the CCP merge list. The syntax level of the filtering flag of the block unit may be a block level, and the syntax level of the high-level syntax higher than the block level may be one of a video level, a sequence level, a picture level, a tile level, and a slice level. Thus, the high-level syntax may be included in one of a video parameter set, a sequence parameter set, a picture parameter set, a picture header, a tile header, and a slice header.

The prediction block of the block unit may be further filtered by the local-boosting filter to generate the predicted block of the block unit when the filtering flag of the block unit inherited from the filtering flag of the selected CCP merge candidate is equal to one. In addition, the prediction block of the block unit may be directly set as CCP predicted block of the block unit, without filtering by the local-boosting filter, when the filtering flag of the block unit inherited from the filtering flag of the selected CCP merge candidate is equal to zero.

The local-boosting filter may have multiple filter coefficients for a central sample and multiple neighboring samples. The number of the filter coefficients may be equal to the total number of the central sample and the neighboring samples (e.g., a filter size of the local-boosting filter). FIGS. 6A-6E are schematic illustrations of multiple filter shapes of the local-boosting filters, in accordance with one or more example implementations of this disclosure. In FIGS. 6A-6E, the filter shapes of the local-boosting filter may include a square, a rectangle, a cross shape, and a diamond shape. It should be noted that the size and the shape of the local-boosting filter may be changed without departing from the scope of the present disclosure.

In some implementations, a central filter coefficient for the center sample may be much higher than multiple neighboring filter coefficients for the neighboring samples, and the neighboring filter coefficients for the neighboring samples may be equal to each other. In some other implementations, each of the neighboring filter coefficients may be determined based on the distance between the central sample and a corresponding one of the neighboring samples. The farther the distance between the central sample and a specific one of the neighboring sample is, the smaller the filter coefficient of the specific neighboring sample is. In some implementations, the central filter coefficient for the center sample may be the largest filter coefficient.

Figures 6A, 6B, 6C:
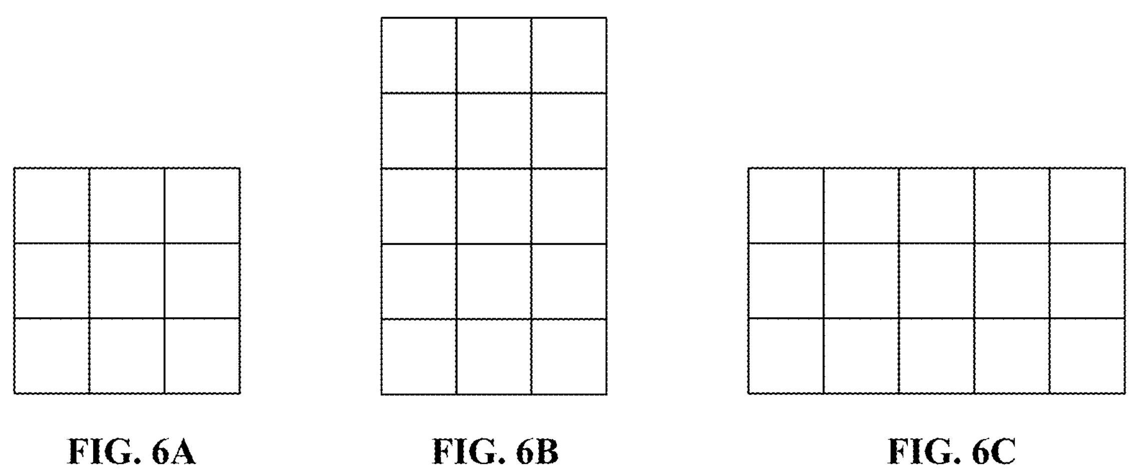
FIGS. 6A-6E are schematic illustrations of multiple filter shapes of the local-boosting filters, in accordance with one or more example implementations of this disclosure.

FIG. 6A illustrates nine filter coefficients for a central sample and eight neighboring samples when the filter size of the local-boosting filter is 3×3. Eight neighboring samples may further include four adjacent samples and four corner samples. Each of the four adjacent samples may share a corresponding one of common boundaries with the central sample, and each of the four corner samples may share a corresponding one of common corners with the central sample. In some implementations, the central filter coefficient for the center sample may be much higher than eight neighboring filter coefficients, equal to each other, for the eight neighboring samples. In some other implementations, the central filter coefficient for the center sample may be higher than four adjacent filter coefficients, equal to each other, for the four adjacent samples, and the adjacent filter coefficients may be higher than four corner filter coefficients, equal to each other, for the four corner samples. For example, the central filter coefficient may be equal to eight, the adjacent filter coefficients may be equal to 2, and the corner filter coefficients may be equal to one. In some implementations, the filter size of the local-boosting filter is 5×5, 7×7, etc.

Figures 6D, 6E:
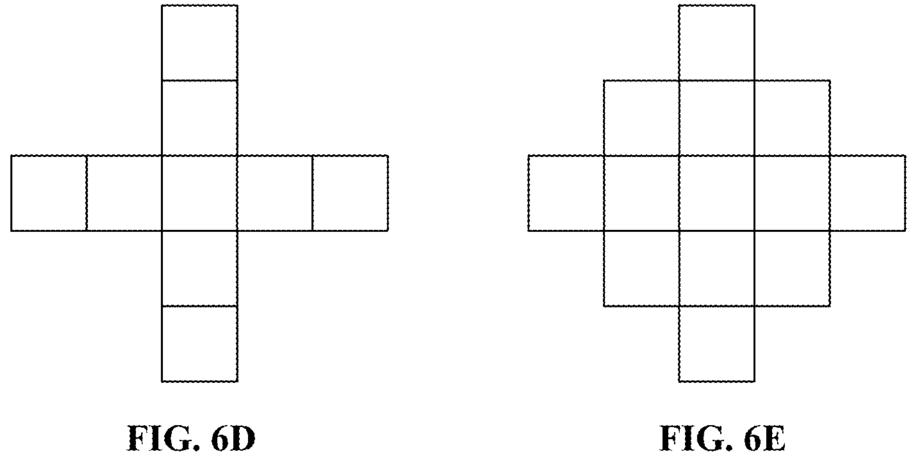

FIG. 6B illustrates fifteen filter coefficients for a central sample and fourteen neighboring samples when the filter size of the local-boosting filter is 3×5. FIG. 6C illustrates fifteen filter coefficients for a central sample and fourteen neighboring samples when the filter size of the local-boosting filter is 5×3. Fourteen neighboring samples, as shown in FIGS. 6B and 6C, may further include four adjacent samples, four corner samples, two side samples, and four diagonal samples. FIG. 6D illustrates nine filter coefficients for a central sample and eight neighboring samples when the filter size of the local-boosting filter is 5×5. Eight neighboring samples, as shown in FIG. 6D, may further include four adjacent samples and four extended samples. FIG. 6E illustrates thirteen filter coefficients for a central sample and twelve neighboring samples when the filter size of the local-boosting filter is 5×5. Twelve neighboring samples, as shown in FIG. 6E, may further include four adjacent samples, four corner samples, and four extended samples. In some implementations, the neighboring filter coefficients for the neighboring samples may be equal to each other. In some other implementations, each of the neighboring filter coefficients may be determined based on the distance between the central sample and a corresponding one of the neighboring samples. The farther the distance between the central sample and a specific one of the neighboring sample is, the smaller the filter coefficient of the specific neighboring sample is.

In some implementations, a filter index may be included in the bitstream for indicating which one of the local-boosting filters is used to filter the prediction block of the block unit.

Referring back to FIG. 5, at block 570, the decoder module 124 may reconstruct the block unit based on the prediction block.

With reference to FIGS. 1 and 2, in some implementations, the decoder module 124 may reconstruct the block unit based on the predicted block. The decoder module 124 may determine multiple residual components from the bitstream for the block unit and add the residual components into the prediction block to reconstruct the block unit. The decoder module 124 may reconstruct all of the other block units in the image frame for reconstructing the image frame and the video.

In some other implementations, the decoder module 124 may further predict the block unit using a CCP derived model to generate a CCP derived block. The generation of the CCP derived block at block 570 may be identical to the generation of the second prediction block at block 360. The decoder module 124 may then reconstruct the block unit based on a weighted block generated by weightedly combining the predicted block and the CCP derived block. The reconstruction of the block unit based on the predicted block and the CCP derived block at block 570 may be identical to the reconstruction of the block unit based on the first prediction block and the second prediction block at block 370 when the block unit is reconstructed by weightedly combining the predicted block and the CCP derived block to generate the weighted block. In some implementations, the CCP derived model may be predefined to be derived by the MM-CCCM prediction mode. In some implementations, the weightedly combination may be regarded as a CCP merge fusion mode. In some implementations, a CCP merge fusion flag may be determined from the bitstream to indicate whether the CCP merge fusion mode is applied on the block unit. Thus, the CCP merge fusion flag equal to one may specify that the block unit is reconstructed based on the predicted block and the CCP derived block of the block unit. The method/process 500 may then end.

Figure 7:
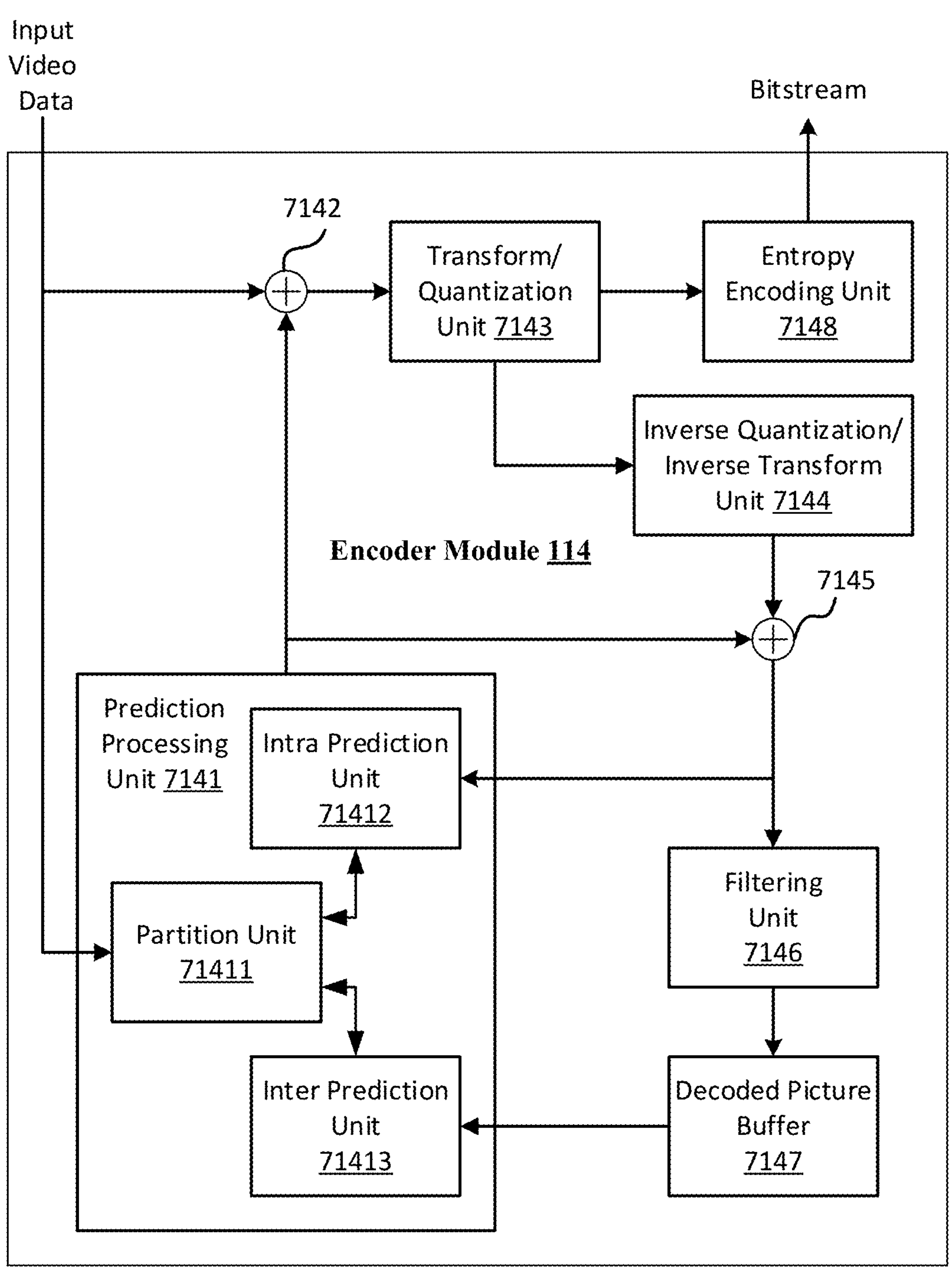
FIG. 7 is a block diagram illustrating an encoder module of the first electronic device illustrated in FIG. 1, in accordance with one or more example implementations of this disclosure.

FIG. 7 is a block diagram illustrating an encoder module 114 of the first electronic device 110 illustrated in FIG. 1, in accordance with one or more example implementations of this disclosure. The encoder module 114 may include a prediction processor (e.g., a prediction processing unit 7141), at least a first summer (e.g., a first summer 7142) and a second summer (e.g., a second summer 7145), a transform/quantization processor (e.g., a transform/quantization unit 7143), an inverse quantization/inverse transform processor (e.g., an inverse quantization/inverse transform unit 7144), a filter (e.g., a filtering unit 7146), a decoded picture buffer (e.g., a decoded picture buffer 7147), and an entropy encoder (e.g., an entropy encoding unit 7148). The prediction processing unit 7141 of the encoder module 114 may further include a partition processor (e.g., a partition unit 71411), an intra prediction processor (e.g., an intra prediction unit 71412), and an inter prediction processor (e.g., an inter prediction unit 71413). The encoder module 114 may receive the source video and encode the source video to output a bitstream.

The encoder module 114 may receive source video including multiple image frames and then divide the image frames according to a coding structure. Each of the image frames may be divided into at least one image block.

The at least one image block may include a luminance block having multiple luminance samples and at least one chrominance block having multiple chrominance samples. The luminance block and the at least one chrominance block may be further divided to generate macroblocks, CTUs, CBs, sub-divisions thereof, and/or other equivalent coding units.

The encoder module 114 may perform additional sub-divisions of the source video. It should be noted that the disclosed implementations are generally applicable to video coding regardless of how the source video is partitioned prior to and/or during the encoding.

During the encoding process, the prediction processing unit 7141 may receive a current image block of a specific one of the image frames. The current image block may be the luminance block or one of the chrominance blocks in the specific image frame.

The partition unit 71411 may divide the current image block into multiple block units. The intra prediction unit 71412 may perform intra-predictive coding of a current block unit relative to one or more neighboring blocks in the same frame as the current block unit in order to provide spatial prediction. The inter prediction unit 71413 may perform inter-predictive coding of the current block unit relative to one or more blocks in one or more reference image blocks to provide temporal prediction.

The prediction processing unit 7141 may select one of the coding results generated by the intra prediction unit 71412 and the inter prediction unit 71413 based on a mode selection method, such as a cost function. The mode selection method may be a rate-distortion optimization (RDO) process.

The prediction processing unit 7141 may determine the selected coding result and provide a predicted block corresponding to the selected coding result to the first summer 7142 for generating a residual block and to the second summer 7145 for reconstructing the encoded block unit. The prediction processing unit 7141 may further provide syntax elements, such as motion vectors, intra-mode indicators, partition information, and/or other syntax information, to the entropy encoding unit 7148.

The intra prediction unit 71412 may intra-predict the current block unit. The intra prediction unit 71412 may determine an intra prediction mode directed toward a reconstructed sample neighboring the current block unit in order to encode the current block unit.

The intra prediction unit 71412 may encode the current block unit using various intra prediction modes. The intra prediction unit 71412 of the prediction processing unit 7141 may select an appropriate intra prediction mode from the selected modes. The intra prediction unit 71412 may encode the current block unit using a cross-component prediction mode to predict one of the two chroma components of the current block unit based on the luma components of the current block unit. The intra prediction unit 71412 may predict a first one of the two chroma components of the current block unit based on the second of the two chroma components of the current block unit.

The inter prediction unit 71413 may inter-predict the current block unit as an alternative to the intra prediction performed by the intra prediction unit 71412. The inter prediction unit 71413 may perform motion estimation to estimate motion of the current block unit for generating a motion vector.

The motion vector may indicate a displacement of the current block unit within the current image block relative to a reference block unit within a reference image block. The inter prediction unit 71413 may receive at least one reference image block stored in the decoded picture buffer 7147 and estimate the motion based on the received reference image blocks to generate the motion vector.

The first summer 7142 may generate the residual block by subtracting the prediction block determined by the prediction processing unit 7141 from the original current block unit. The first summer 7142 may represent the component or components that perform this subtraction.

The transform/quantization unit 7143 may apply a transform to the residual block in order to generate a residual transform coefficient and then quantize the residual transform coefficients to further reduce the bit rate. The transform may be one of a DCT, DST, AMT, MDNSST, HyGT, signal-dependent transform, KLT, wavelet transform, integer transform, sub-band transform, and a conceptually similar transform.

The transform may convert the residual information from a pixel value domain to a transform domain, such as a frequency domain. The degree of quantization may be modified by adjusting a quantization parameter.

The transform/quantization unit 7143 may perform a scan of the matrix including the quantized transform coefficients. Alternatively, the entropy encoding unit 7148 may perform the scan.

The entropy encoding unit 7148 may receive multiple syntax elements from the prediction processing unit 7141 and the transform/quantization unit 7143, including a quantization parameter, transform data, motion vectors, intra modes, partition information, and/or other syntax information. The entropy encoding unit 7148 may encode the syntax elements into the bitstream.

The entropy encoding unit 7148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120, as shown in FIG. 1) or archived for later transmission or retrieval.

The inverse quantization/inverse transform unit 7144 may apply inverse quantization and inverse transformation to reconstruct the residual block in the pixel domain for later use as a reference block. The second summer 7145 may add the reconstructed residual block to the prediction block provided by the prediction processing unit 7141 in order to produce a reconstructed block for storage in the decoded picture buffer 7147.

The filtering unit 7146 may include a deblocking filter, an SAO filter, a bilateral filter, and/or an ALF to remove blocking artifacts from the reconstructed block. Other filters (in loop or post loop) may be used in addition to the deblocking filter, the SAO filter, the bilateral filter, and the ALF. Such filters are not illustrated for brevity and may filter the output of the second summer 7145.

The decoded picture buffer 7147 may be a reference picture memory that stores the reference block to be used by the encoder module 714 to encode video, such as in intra-coding or inter-coding modes. The decoded picture buffer 7147 may include a variety of memory devices, such as DRAM (e.g., including SDRAM), MRAM, RRAM, or other types of memory devices. The decoded picture buffer 7147 may be on-chip with other components of the encoder module 114 or off-chip relative to those components.

The method/process 300 for decoding and/or encoding video data may be performed by the first electronic device 110. With reference to FIGS. 1 and 7, at block 310, the method/process 300 may start by the encoder module 114 receiving the video data. The video data received by the encoder module 114 may be a video. At block 320, the encoder module 114 may determine a block unit from a current frame included in the video data. The encoder module 114 may divide the current frame to generate multiple CTUs, and further divide a current CTU included in the CTUs to generate multiple divided blocks and to determine the block unit from the divided blocks, according to the partition indications (e.g., based on any video coding standard).

At block 330, the encoder module 114 may determine a cross-component prediction (CCP) merge list of the block unit including multiple CCP merge candidates of the block unit. With reference to FIGS. 1 and 7, the CCP merge candidates of the block unit determined by the encoder module 114 may be identical to the CCP merge candidates of the block unit determined by the decoder module 124. In addition, the CCP predefined candidates determined by the encoder module 114 may also be identical to the CCP predefined candidates determined by the decoder module 124.

At block 340, the encoder module 114 may select one of the multiple CCP merge candidates for the block unit to determine a prediction model of the selected CCP merge candidate. With reference to FIGS. 1 and 7, the encoder module 114 may determine multiple prediction models for the block unit based on the CCP merge candidates. In some implementations, the encoder module 114 may determines each of multiple CCP candidate blocks corresponding to each of the CCP merge candidates as one of multiple reference blocks. In other words, the encoder module 114 may predict the block unit by using each of the prediction models of the CCP merge candidates, and then select one of the CCP merge candidates based on multiple predicted results of the CCP merge candidates in the following blocks of the method/process 300. Thus, the encoder module 114 may encode an index into the bitstream for the decoder module 124 to determine the selected CCP merge candidate of the block unit. In some other implementations, the encoder module 114 may determine, based on the template cost values, only one reference block of the block unit for determining the selected CCP merge candidate. The reference block may be predicted using the prediction model. The template cost values may be generated by comparing each of multiple predicted results of a chroma template region of the block unit with a reconstructed result of the chroma template region of the block unit. The calculation and the usage of the template cost values at block 340 by the encoder module 114 may be identical to those at block 340 by the decoder module 124. Thus, the encoder module 114 may not encode any index into the bitstream for determining the selected CCP merge candidate of the block unit.

At block 350, the encoder module 114 may predict the block unit using the prediction model of the selected CCP merge candidate to generate a first prediction block.

With reference to FIGS. 1 and 7, in some implementations, the block unit may inherit the prediction model of a specific one of the reference blocks corresponding to the selected CCP merge candidate, when the encoder module 114 is predicting the block unit using the prediction model of the specific reference block. Thus, a specific one of multiple prediction models of the block unit may be identical to the prediction model of the specific reference block. Thus, the encoder module 114 may predict the block unit using the specific prediction model of the block unit to generate a specific one of multiple first prediction blocks.

In some implementations, the encoder module 114 may further refine the prediction models based on multiple model refinement modes, such as a slope refinement mode, to generate multiple refined prediction models before the block unit is predicted. The encoder module 114 may then predict the block unit using each of the refined prediction models to generate a corresponding one of the first prediction blocks. In some other implementations, the encoder module 114 may not refine the prediction model. Thus, the encoder module 114 may predict the block unit directly using each of the prediction models to generate a corresponding one of the first prediction blocks.

At block 360, the encoder module 114 may predict the block unit using a CCP derived model to generate a second prediction block.

With reference to FIGS. 1 and 7, in some implementations, the encoder module 114 may select a second one of the CCP merge candidates based on the predicted results of the CCP merge candidates, when the encoder module 114 predicts the block unit by using each of the CCP merge candidates. Thus, the encoder module 114 may encode an index into the bitstream for the decoder module 124 to determine the second one of the CCP merge candidates of the block unit. In some other implementations, the encoder module 114 may select a second one of the CCP merge candidates based on template cost values when the encoder module 114 compares each of the predicted results of the chroma template region of the block unit with the reconstructed result of the chroma template region of the block unit. The calculation and the usage of the template cost values at block 360 by the encoder module 114 may be identical to those by the decoder module 124. Thus, the encoder module 114 may not encode any index into the bitstream for determining the second one of the CCP merge candidates of the block unit. In some implementations, the cross-component model modes of the CCP derived model selected from the CCP merge list may include the MM-CCCM mode.

In yet other implementations, the encoder module 114 may derive the CCP derived model based on reconstructed results of a chroma neighboring region and a luma neighboring region using at least one of multiple cross-component model modes to generate at least one of the CCP derived models. In some implementations, the cross-component model modes of the CCP derived model derived based on the reconstructed results of the chroma neighboring region and the luma neighboring region may include the MM-CCCM mode.

The luma samples of the block unit may be reconstructed prior to the reconstruction of the chroma samples of the block unit. Thus, the encoder module 114 may also determine the reconstructed luma samples of the block unit and predict the chroma samples of the block unit using each of the CCP derived models based on the reconstructed luma samples to generate a corresponding one of the second prediction blocks. In some implementations, the cross-component model modes of the CCP derived model may be predefined as the MM-CCCM mode.

At block 370, the encoder module 114 may reconstruct the block unit based on the first prediction block and the second prediction block.

The encoder module 114 may weightedly combine one of the first prediction blocks and one of the second prediction blocks based on multiple weighting parameters to generate one of multiple first predicted blocks. In some implementations, the weighting parameters may be predefined. For examples, both of the two weighting parameters may be equal to 0.5. In some other implementations, the weighting parameters may be derived based on the template cost values, which may result in parameter indices of the block unit being signaled into the bitstream to indicating the weighting parameters. It should be noted that the scheme for determining the selected CCP merge candidate may be changed without departing from the scope of the present disclosure.

In some implementations, the encoder module 114 may further determine at least one third prediction block, each generated, respectively, based on different prediction schemes for weightedly combining with one of the first prediction blocks and one of the second prediction blocks. Thus, when the weighting parameters are determined based on the parameter indices included in the bitstream, there may be more than two parameter indices included in the bitstream.

The encoder module 114 may predict the block unit based on other prediction modes to generate multiple second predicted blocks. The encoder module 114 may select one of the first predicted blocks and the second predicted blocks based on a mode selection method, such as a cost function. The mode selection method may be an RDO process. The encoder module 114 may provide the selected coding result to the first summer 7142 for generating a residual block and to the second summer 7145 for reconstructing the encoded block unit. The encoder module 114 may further provide syntax elements, such as a merge index and a CCP merge fusion mode, included in the bitstream for transmitting to the decoder module 124. The reconstruction of the block unit by the encoder module 114 may be identical to the reconstruction of the block unit by the decoder module 124. In some implementations, the merge index may be used for determining which one or two of the CCP merge candidates are selected based on the mode selection method. In some implementations, the CCP merge fusion flag may be used to indicate whether the CCP merge fusion mode is applied on the block unit. The method/process 300 for the encoder module 114 may then end.

The method/process 400 for decoding and/or encoding video data may be performed by the first electronic device 110. With reference to FIGS. 1 and 7, at block 410, the method/process 400 may start by the encoder module 114 receiving the video data. The video data received by the encoder module 114 may be a video. At block 420, the encoder module 114 may determine a block unit from a current frame included in the video data. The encoder module 114 may divide the current frame to generate multiple CTUs, and further divide a current CTU included in the CTUs to generate multiple divided blocks and to determine the block unit from the divided blocks, according to the partition indications (e.g., based on any video coding standard).

At block 430, the encoder module 114 may determine a cross-component prediction (CCP) merge list of the block unit including multiple CCP merge candidates and at least one combination candidate of the block unit.

With reference to FIGS. 1 and 7, the CCP merge candidates of the block unit is included in the CCP merge list of the block unit. The CCP merge candidates of the block unit determined by the encoder module 114 may be identical to the CCP merge candidates of the block unit determined by the decoder module 124. In addition, the CCP predefined candidates determined by the encoder module 114 may also be identical to the CCP predefined candidates determined by the decoder module 124.

The at least one combination candidate of the block unit determined by the encoder module 114 may be identical to the at least one combination candidate of the block unit determined by the decoder module 124. In addition, the order in which the at least one combination candidate and the CCP merge candidates are constructed in the CCP merge list by the encoder module 114 may be identical to the order used by the decoder module 124. Furthermore, the reordering scheme of the at least one combination candidate and the CCP merge candidates in the CCP merge list by the encoder module 114 may be identical to the reordering scheme of the at least one combination candidate and the CCP merge candidates in the CCP merge list by the decoder module 124.

At block 440, the encoder module 114 may reconstruct the block unit based on the CCP merge list.

With reference to FIGS. 1 and 7, in some implementations, the encoder module 114 may predict the block unit using each of the at least one combination candidate and the CCP merge candidates in the CCP merge list to generate one of multiple first prediction blocks. The generation scheme of the first prediction blocks using the CCP merge candidates at block 440 by the encoder module 114 may be identical to the generation scheme of the first prediction blocks using the CCP merge candidates at block 350 by the encoder module 114. In addition, the generation scheme of the first prediction blocks using the at least one combination candidate at block 440 by the encoder module 114 may also be identical to the generation scheme of the first prediction blocks using the CCP merge candidates at block 350 by the encoder module 114. Furthermore, the encoder module 114 may predict the block unit based on other prediction modes to generate multiple predicted blocks. The encoder module 114 may select one of the first prediction blocks and the predicted blocks based on a mode selection method, such as a cost function. The mode selection method may be an RDO process. The encoder module 114 may provide the selected coding result to the first summer 7142 for generating a residual block and to the second summer 7145 for reconstructing the encoded block unit. The reconstruction of the block unit by the encoder module 114 may be identical to the reconstruction of the block unit by the decoder module 124.

In some other implementations, the encoder module 114 may further predict the block unit using each of multiple CCP derived models to generate one of multiple second prediction blocks. The generation scheme of the second prediction blocks using the CCP derived models at block 440 by the encoder module 114 may be identical to the generation scheme of the second prediction blocks using the CCP derived models at block 360 by the encoder module 114. Furthermore, the reconstruction of the block unit at block 440 by the encoder module 114 may be identical to the reconstruction of the block unit at block 370 by the encoder module 114 when one of the first prediction blocks and one of the second prediction blocks are weightedly combined.

The encoder module 114 may further provide syntax elements, such as a merge index, included in the bitstream for transmitting to the decoder module 124. In some implementations, the merge index may be used for determining which one of the CCP merge candidates and the at least one combination candidate is selected based on the mode selection method. In some implementations, the CCP merge fusion flag may also be used to indicate whether the CCP merge fusion mode is applied on the block unit. The method/process 400 for the encoder module 114 may then end.

The method/process 500 for decoding and/or encoding video data may be performed by the first electronic device 110. With reference to FIGS. 1 and 7, at block 510, the method/process 500 may start by the encoder module 114 receiving the video data. The video data received by the encoder module 114 may be a video. At block 520, the encoder module 114 may determine a block unit from a current frame included in the video data. The encoder module 114 may divide the current frame to generate multiple CTUs, and further divide a current CTU included in the CTUs to generate multiple divided blocks and to determine the block unit from the divided blocks, according to the partition indications (e.g., based on any video coding standard).

At block 530, the encoder module 114 may determine a cross-component prediction (CCP) merge list of the block unit including multiple CCP merge candidates of the block unit. In some implementations, the CCP merge list may only include the CCP merge candidates. In some other implementations, the CCP merge list may include the CCP merge candidates and at least one combination candidate. With reference to FIGS. 1 and 7, the CCP merge candidates of the block unit determined by the encoder module 114 may be identical to those determined by the decoder module 124. The CCP predefined candidates determined by the encoder module 114 may also be identical to those determined by the decoder module 124. In addition, the at least one combination candidate of the block unit determined by the encoder module 114 may be identical to that determined by the decoder module 124.

At block 540, the encoder module 114 may select one of the multiple CCP merge candidates for the block unit to determine a prediction model and a filtering flag of the selected CCP merge candidate. With reference to FIGS. 1 and 7, in some implementations, the encoder module 114 may determine multiple prediction models and multiple filtering flags for the block unit based on the CCP merge candidates. The encoder module 114 may determines each of multiple CCP candidate blocks corresponding to each of the CCP merge candidates as one of multiple reference blocks. In other words, the encoder module 114 may predict the block unit by using each of the prediction models and the filtering flags of the CCP merge candidates, and then select one of the CCP merge candidates based on multiple predicted results of the CCP merge candidates in the following blocks of the method/process 500. In some other implementations, the encoder module 114 may determine multiple prediction models and multiple filtering flags for the block unit based on the CCP merge candidates and the at least one combination candidate for predicting the block unit. Thus, the encoder module 114 may encode an index into the bitstream for the decoder module 124 to determine the selected CCP merge candidate of the block unit.

In some other implementations, the encoder module 114 may determine, based on the template cost values, only one candidate in the CCP merge list of the block unit. The selected candidate may be used for predicting the block unit using one of the prediction models with or without a low-pass filter. The calculation and the usage of the template cost values at block 540 by the encoder module 114 may be identical to those at block 540 by the decoder module 124. Thus, the encoder module 114 may not encode any index into the bitstream for determining the selected candidate of the block unit.

At block 550, the encoder module 114 may predict the block unit using the prediction model to generate a prediction block of the block unit.

With reference to FIGS. 1 and 7, in some implementations, the block unit may inherit the prediction model of a specific one of the reference blocks corresponding to the selected candidate, when the encoder module 114 is predicting the block unit using the prediction model of the specific reference block. Thus, a specific one of multiple prediction models of the block unit may be identical to the prediction model of the specific reference block. Thus, the encoder module 114 may predict the block unit using the specific prediction model of the block unit to generate a specific one of multiple first prediction blocks.

In some implementations, the encoder module 114 may further refine the prediction models based on multiple model refinement modes, such as a slope refinement mode, to generate multiple refined prediction models before the block unit is predicted. The encoder module 114 may then predict the block unit using each of the refined prediction models to generate a corresponding one of the first prediction blocks. In some other implementations, the encoder module 114 may not refine the prediction model. Thus, the encoder module 114 may predict the block unit directly using each of the prediction models to generate a corresponding one of the first prediction blocks.

Referring back to FIG. 5, at block 560, the encoder module 114 may determine, based on the filtering flag of the selected CCP merge candidate, whether the prediction block of the block unit is further filtered to generate a predicted block of the block unit or not. In some implementations, the prediction block of the block unit may be filter by the low-pass filter, such as the local-boosting filter. The filter used by the encoder module 114 may be identical to the filter used by the decoder module 124.

With reference to FIGS. 1 and 7, the encoder module 114 may determine, based on one of multiple filtering flags of the block unit, whether a corresponding one of the prediction blocks is further filtered to generate a corresponding one of the predicted blocks of the block unit after the block unit is predicted using a corresponding one of the prediction models. In addition, when a particular one of the prediction blocks of the block unit is not filtered, the particular prediction block of the block unit may be directly regarded as one of the predicted blocks of the block unit.

In some implementations, one of the filtering flags of the block unit may be directly inherited from the filtering flag of a corresponding one of the CCP merge candidates when the block unit is predicted based on the CCP merge list. In some other implementations, one of the filtering flags of the block unit may be directly inherited from the filtering flag of a corresponding one of the CCP merge candidates when the cross-component model mode of the corresponding CCP merge candidate is one of the multiple-model cross-component prediction modes. In addition, one of the filtering flags of the block unit may be determined based on other schemes when the cross-component model mode of a corresponding one of the CCP merge candidates is different from the multiple-model cross-component prediction modes. For example, one of the filtering flags of the block unit may be determined based on the template cost values of an unfiltered result and a filtered result when the cross-component model mode of a corresponding one of the CCP merge candidates is different from the multiple-model cross-component prediction modes. In some other implementations, one of the filtering flags of the block unit may be determined based on the template cost values of an unfiltered result and a filtered result when a corresponding one of the prediction models of the block unit is determined based on the CCP merge list. The value determination of the filtering flag of the block unit at block 560 by the encoder module 114 may be identical to that at block 560 by the decoder module 124.

In some other implementations, the filtering flag of the block unit may be predefined to be equal to one when the prediction model of the block unit is determined based on the CCP merge list. In some other implementations, the filtering flag of the block unit may be determined based on a high-level syntax corresponding to the block unit when the prediction model of the block unit is determined based on the CCP merge list.

In yet other implementations, when the cross-component model mode of a corresponding one of the CCP merge candidates is different from the multiple-model cross-component prediction modes, the encoder module 114 may filter the corresponding prediction block to generate one of the predicted blocks. In addition, when the cross-component model mode of a corresponding one of the CCP merge candidates is different from the multiple-model cross-component prediction modes, the corresponding prediction block may be also regarded as one of the predicted blocks. Thus, the encoder module 114 may then determine the value of the filtering flag based on a mode selection method, such as a cost function, at block 570 of the method/process 500.

Referring back to FIG. 5, at block 570, the encoder module 114 may reconstruct the block unit based on the predicted block.

With reference to FIGS. 1 and 7, in some implementations, the encoder module 114 may predict the block unit based on other prediction modes to generate multiple predicted units. The encoder module 114 may select one of the predicted blocks and the predicted units based on the mode selection method. The mode selection method may be an RDO process. The encoder module 114 may provide the selected coding result to the first summer 7142 for generating a residual block and to the second summer 7145 for reconstructing the encoded block unit. The reconstruction of the block unit by the encoder module 114 may be identical to the reconstruction of the block unit by the decoder module 124.

In some other implementations, the encoder module 114 may further predict the block unit using each of multiple CCP derived models to generate one of multiple CCP derived blocks. The generation scheme of the CCP derived blocks using the CCP derived models at block 570 by the encoder module 114 may be identical to the generation scheme of the second prediction blocks using the CCP derived models at block 360 by the encoder module 114. Furthermore, the reconstruction of the block unit at block 570 by the encoder module 114 may be identical to the reconstruction of the block unit at block 370 by the encoder module 114 when one of the predicted blocks and one of the CCP derived blocks are weightedly combined. The method/process 500 for the encoder module 114 may then end.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of decoding video data performed by an electronic device, the method comprising:

receiving the video data;

determining a block unit from a current frame that is included in the video data;

determining a cross-component prediction (CCP) merge list of the block unit, the CCP merge list including a plurality of CCP merge candidates of the block unit;

determining, from the video data, a merge index of the block unit;

selecting, using the merge index of the block unit, one of the plurality of CCP merge candidates, and determining a prediction model and a filtering flag of the selected one of the plurality of CCP merge candidates, as a prediction model and a filtering flag of the block unit, wherein the filtering flag of the selected one of the plurality of CCP merge candidates being equal to one specifies that a CCP reference prediction is further filtered after a CCP reference block, corresponding to the selected one of the plurality of CCP merge candidates, is predicted, wherein the CCP reference block is predicted by using the prediction model of the selected one of the plurality of CCP merge candidates to generate the CCP reference prediction;

predicting the block unit, using the prediction model of the block unit, to generate a prediction block of the block unit;

determining, using the filtering flag of the block unit, whether the prediction block of the block unit is further filtered to generate a predicted block of the block unit; and reconstructing the block unit using the predicted block of the block unit.

2. The method according to claim 1, wherein:

the filtering flag of the selected one of the plurality of CCP merge candidates is determined from the video data for determining whether the prediction block of the block unit is further filtered when a cross-component model mode of the prediction model of the selected one of the plurality of CCP merge candidates is one of a plurality of multiple-model cross-component prediction modes, and the filtering flag of the selected one of the plurality of CCP merge candidates is determined to be equal to zero without parsing the video data for determining that the prediction block of the block unit is not filtered when the cross-component model mode of the prediction model of the selected one of the plurality of CCP merge candidates is different from each of the plurality of multiple-model cross-component prediction modes.

3. The method according to claim 2, wherein:

the plurality of multiple-model cross-component prediction modes includes a multiple-model linear model (MMLM) prediction mode, a multiple-model gradient linear mode (MM-GLM) prediction mode, a multiple-model convolutional cross-component model (MM-CCCM) prediction mode, a multiple-model gradient-and-location-based convolutional cross-component model (MM-GL-CCCM) prediction mode, a multiple-model no-subsampling convolutional cross-component model (MM-NS-CCCM) prediction mode, and a multiple-model convolutional cross-component model using multiple down-sampling filters (MM-MDF-CCCM) prediction mode.

4. The method according to claim 1, wherein:

each of the plurality of CCP merge candidates of the block unit has a CCP candidate model, the prediction model of the selected one of the plurality of CCP merge candidates comprises the CCP candidate model of the selected one of the plurality of CCP merge candidates, the CCP candidate model having a plurality of model coefficients, and the block unit is predicted by further using the plurality of model coefficients to generate the prediction block of the block unit.

5. The method according to claim 1, wherein:

the plurality of CCP merge candidates of the block unit is selected from a plurality of CCP predefined candidates, and the plurality of CCP predefined candidates includes at least one of a plurality of spatial adjacent CCP merge candidates, a plurality of spatial non-adjacent CCP merge candidates, a plurality of history-based CCP merge candidates, a plurality of temporal CCP merge candidates, a plurality of block-vector-based CCP merge candidates, or a plurality of default CCP merge candidates.

6. The method according to claim 1, wherein:

the filtering flag of the selected one of the plurality of CCP merge candidates is a ccFilter flag that indicates whether the CCP reference prediction is further filtered by a local-boosting filter, and the filtering flag of the selected one of the plurality of CCP merge candidates being equal to zero specifies that the CCP reference prediction is not filtered by the local-boosting filter.

7. The method according to claim 6, wherein:

the prediction block of the block unit is further filtered by the local-boosting filter to generate the predicted block of the block unit when the filtering flag of the block unit, inherited from the filtering flag of the selected one of the plurality of CCP merge candidates, is equal to one, and the prediction block of the block unit is determined, without being filtered by the local-boosting filter, as the predicted block of the block unit when the filtering flag of the block unit, inherited from the filtering flag of the selected one of the plurality of CCP merge candidates, is equal to zero.

8. The method according to claim 1, further comprising:

determining a CCP derived model for the block unit, wherein the CCP derived model is derived by an MM-CCCM prediction mode; and predicting the block unit, using the CCP derived model, to generate a CCP derived block of the block unit.

9. The method according to claim 8, further comprising:

determining, using two weighting parameters, a weighted combination of the predicted block and the CCP derived block of the block unit to generate a weighted block, wherein reconstructing the block unit using the predicted block of the block unit is performed by reconstructing the block unit using the weighted block.

10. The method according to claim 8, further comprising:

determining a CCP merge fusion flag from the video data, wherein the CCP merge fusion flag being equal to one specifies that reconstructing the block unit using the predicted block of the block unit is further based on the CCP derived block of the block unit.

11. The method according to claim 8, further comprising:

determining a CCP merge block of the block unit based on the plurality of CCP merge candidates to determine the CCP merge model of the CCP merge block, wherein:

the CCP merge model of the CCP merge block is used to predict the CCP merge block, and the CCP derived model of the block unit is inherited from the CCP merge model of the CCP merge block for predicting the block unit.

12. An electronic device for decoding video data, the electronic device comprising:

at least one processor; and at least one non-transitory computer-readable medium coupled to the at least one processor and storing one or more computer-executable instructions that, when executed by the at least one processor, cause the electronic device to:

receive the video data;

determine a block unit from a current frame that is included in the video data;

determine a cross-component prediction (CCP) merge list of the block unit, the CCP merge list including a plurality of CCP merge candidates of the block unit;

determine a merge index of the block unit from the video data;

select, using the merge index of the block unit, one of the plurality of CCP merge candidates, and determining a prediction model and a filtering flag of the selected one of the plurality of CCP merge candidates, as a prediction model and a filtering flag of the block unit, wherein the filtering flag of the selected one of the plurality of CCP merge candidates being equal to one specifies that a CCP reference prediction is further filtered after a CCP reference block, corresponding to the selected one of the plurality of CCP merge candidates, is predicted, wherein the CCP reference block is predicted by using the prediction model of the selected one of the plurality of CCP merge candidates to generate the CCP reference prediction;

predict the block unit, using the prediction model of the block unit, to generate a prediction block of the block unit;

determine, using the filtering flag of the block unit, whether the prediction block of the block unit is further filtered to generate a predicted block of the block unit; and reconstruct the block unit using the predicted block of the block unit.

13. The electronic device according to claim 12, wherein:

the filtering flag of the selected one of the plurality of CCP merge candidates is determined from the video data for determining whether the prediction block of the block unit is further filtered when a cross-component model mode of the prediction model of the selected one of the plurality of CCP merge candidates is one of a plurality of multiple-model cross-component prediction modes, and the filtering flag of the selected one of the plurality of CCP merge candidates is determined to be equal to zero without parsing the video data for determining that the prediction block of the block unit is not filtered when the cross-component model mode of the prediction model of the selected one of the plurality of CCP merge candidates is different from each of the plurality of multiple-model cross-component prediction modes.

14. The electronic device according to claim 12, wherein:

each of the plurality of CCP merge candidates of the block unit has a CCP candidate model, the prediction model of the selected one of the plurality of CCP merge candidates comprises the CCP candidate model of the selected one of the plurality of CCP merge candidates, the CCP candidate model having a plurality of model coefficients, and the block unit is predicted by further using the plurality of model coefficients to generate the prediction block of the block unit.

15. The electronic device according to claim 12, wherein: the filtering flag of the selected one of the plurality of CCP merge candidates is a ccFilter flag that indicates whether the CCP reference prediction is further filtered by a local-boosting filter, and the filtering flag of the selected one of the plurality of CCP merge candidates being equal to zero specifies that the CCP reference prediction is not filtered by the local-boosting filter.

16. The electronic device according to claim 15, wherein: the prediction block of the block unit is further filtered by the local-boosting filter to generate the predicted block of the block unit when the filtering flag of the block unit, inherited from the filtering flag of the selected one of the plurality of CCP merge candidates, is equal to one, and the prediction block of the block unit is determined, without being filtered by the local-boosting filter, as the predicted block of the block unit when the filtering flag of the block unit, inherited from the filtering flag of the selected one of the plurality of CCP merge candidates, is equal to zero.

17. The electronic device according to claim 12, wherein the one or more computer-executable instructions, when executed by the at least one processor, further cause the electronic device to:

determine a CCP derived model for the block unit, wherein the CCP derived model is derived by an MM-CCCM prediction mode; and predict the block unit, using the CCP derived model, to generate a CCP derived block of the block unit.

18. The electronic device according to claim 17, wherein the one or more computer-executable instructions, when executed by the at least one processor, further cause the electronic device to:

determine, using two weighting parameters, a weighted combination of the predicted block and the CCP derived block of the block unit to generate a weighted block, wherein reconstructing the block unit using the predicted block of the block unit is performed by reconstructing the block unit using the weighted block.

19. The electronic device according to claim 17, wherein the one or more computer-executable instructions, when executed by the at least one processor, further cause the electronic device to:

determine a CCP merge fusion flag from the video data, wherein the CCP merge fusion flag being equal to one specifies that reconstructing the block unit using the predicted block of the block unit is further based on the CCP derived block of the block unit.

20. The electronic device according to claim 17, wherein the one or more computer-executable instructions, when executed by the at least one processor, further cause the electronic device to:

determine a CCP merge block of the block unit based on the plurality of CCP merge candidates to determine the CCP merge model of the CCP merge block, wherein:

the CCP merge model of the CCP merge block is used to predict the CCP merge block, and the CCP derived model of the block unit is inherited from the CCP merge model of the CCP merge block for predicting the block unit.

* * * * *